United States Patent
Miyake et al.

(12) 
(10) Patent No.: US 6,597,467 B2
(45) Date of Patent: *Jul. 22, 2003

(54) IMAGE PROCESSING APPARATUS FOR TRANSMITTING COMPRESSED AREA INFORMATION TO BE USED IN EDITING

(75) Inventors: Nobutaka Miyake, Yokohama (JP); Yoshitake Nagashima, Chigasaki (JP); Tadayoshi Nakayama, Tokyo (JP); Yuji Konno, Yokohama (JP); Hiromi Fukuda, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,225

(22) Filed: Jun. 4, 1997

(65) Prior Publication Data
US 2002/0041387 A1 Apr. 11, 2002

Related U.S. Application Data

(63) Continuation of application No. 08/112,376, filed on Aug. 27, 1993.

(30) Foreign Application Priority Data

Aug. 31, 1992 (JP) ............................................. 4-231982
Jul. 29, 1993 (JP) ............................................. 5-188399

(51) Int. Cl.$^7$ .............................................. G06F 15/00
(52) U.S. Cl. ........................................ 358/1.15; 358/1.1
(58) Field of Search ................................... 395/101, 102, 395/106, 109, 111, 112, 113, 114; 358/501, 532, 537, 538, 540, 401, 409, 261.1, 261.2, 450, 452, 1.1, 1.2, 1.6, 1.9, 1.12, 1.13, 1.14, 1.15; 382/232, 235

(56) References Cited

U.S. PATENT DOCUMENTS 5,526,123 A 6/1996 Yoshida et al. .......... 358/261.3

FOREIGN PATENT DOCUMENTS

| JP | 3-220864 | 9/1991 |
| JP | 4-088751 | 3/1992 |
| JP | 4-220077 | 8/1992 |
| JP | 4-235468 | 8/1992 |

Primary Examiner—Gabriel Garcia
(74) Attorney, Agent, or Firm—Fitzpatrick, Cella, Harper & Scinto

(57) ABSTRACT

In an image processing method, image information described by a page descriptor language is developed by the page descriptor language into a form not pasted with to-be-pasted image information, without reading out, for image development, the to-be-pasted image information from a unit for storing the to-be-pasted image information. The image information in the form not pasted with the to-be-pasted image information and the to-be-pasted image information are separately transmitted to a printer. The image information in the form not pasted with the to-be-pasted image information is compressed by reversible coding. The to-be-pasted information is compressed by irreversible coding.

11 Claims, 34 Drawing Sheets

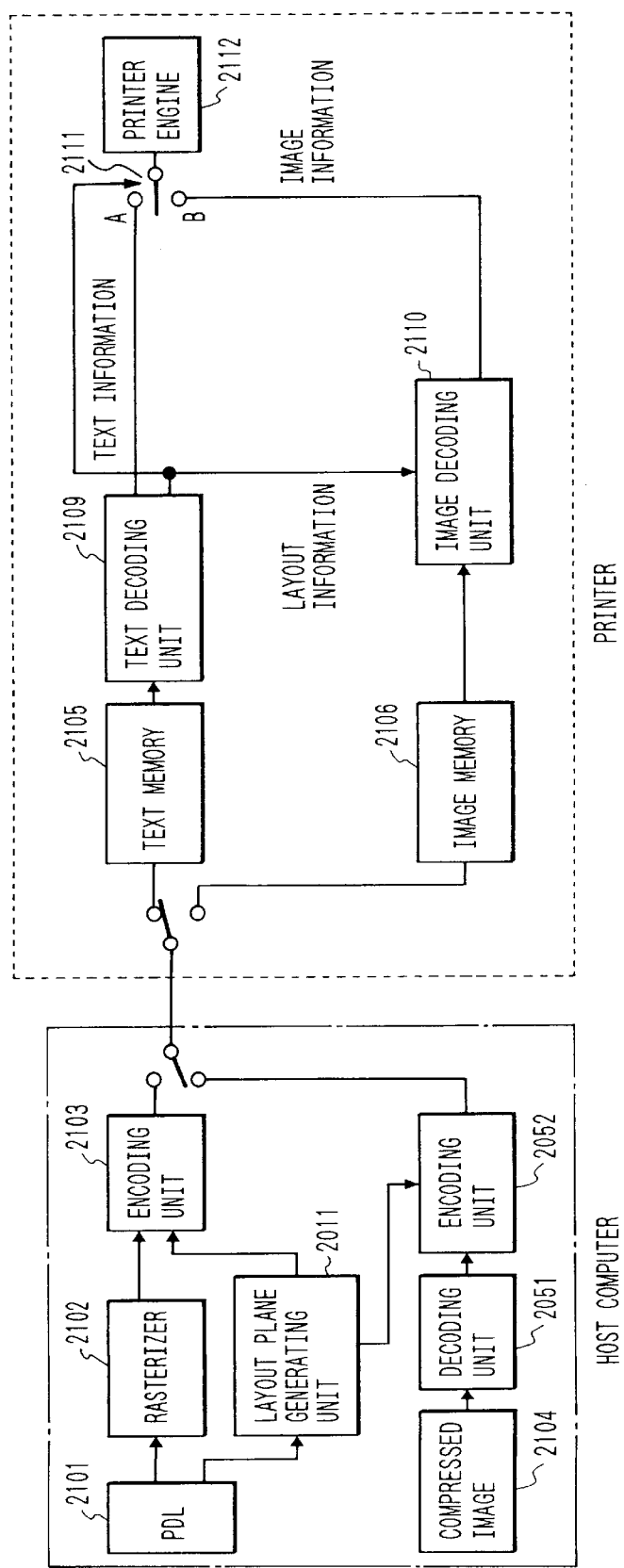

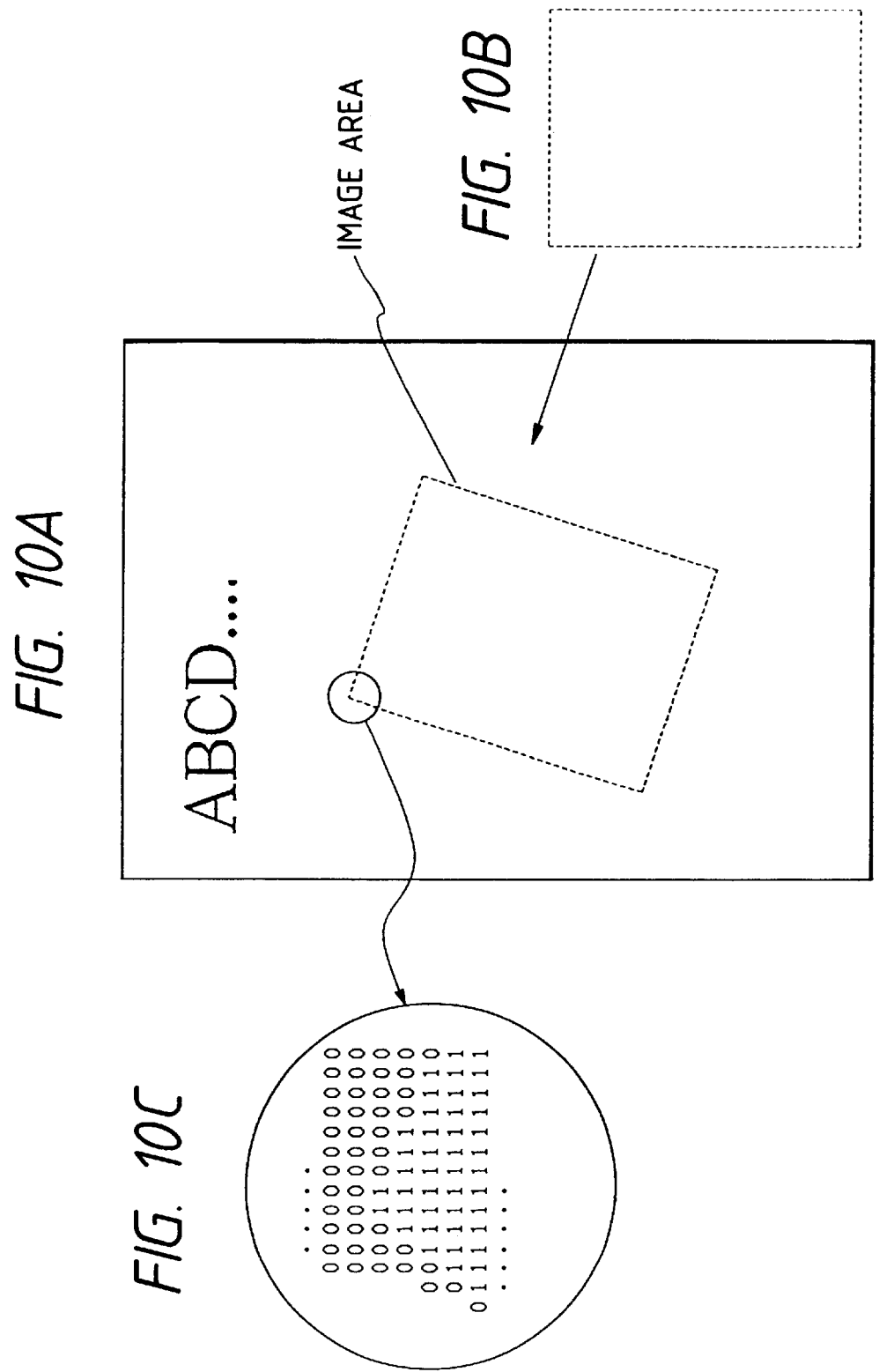

```
. . . . .
0 0 0 0 0 0 0 0 0 0 0 0
0 0 0 0 0 0 0 0 0 0 0 0
0 0 0 1 1 0 0 0 0 0 0 0
0 0 1 1 1 1 1 1 0 0 0 0
0 0 1 1 1 1 1 1 1 1 1 0
0 1 1 1 1 1 1 1 1 1 1 1
0 1 1 1 1 1 1 1 1 1 1 1 1
. . . . . .
```

```
. . . . .
0 0 0 0 0 0 0 0 0 0 0 0
0 0 0 0 0 0 0 0 0 0 0 0
0 0 0 1 2 0 0 0 0 0 0 0
0 0 3 4 5 6 7 8 0 0 0 0
0 0 9 . . . . .
```

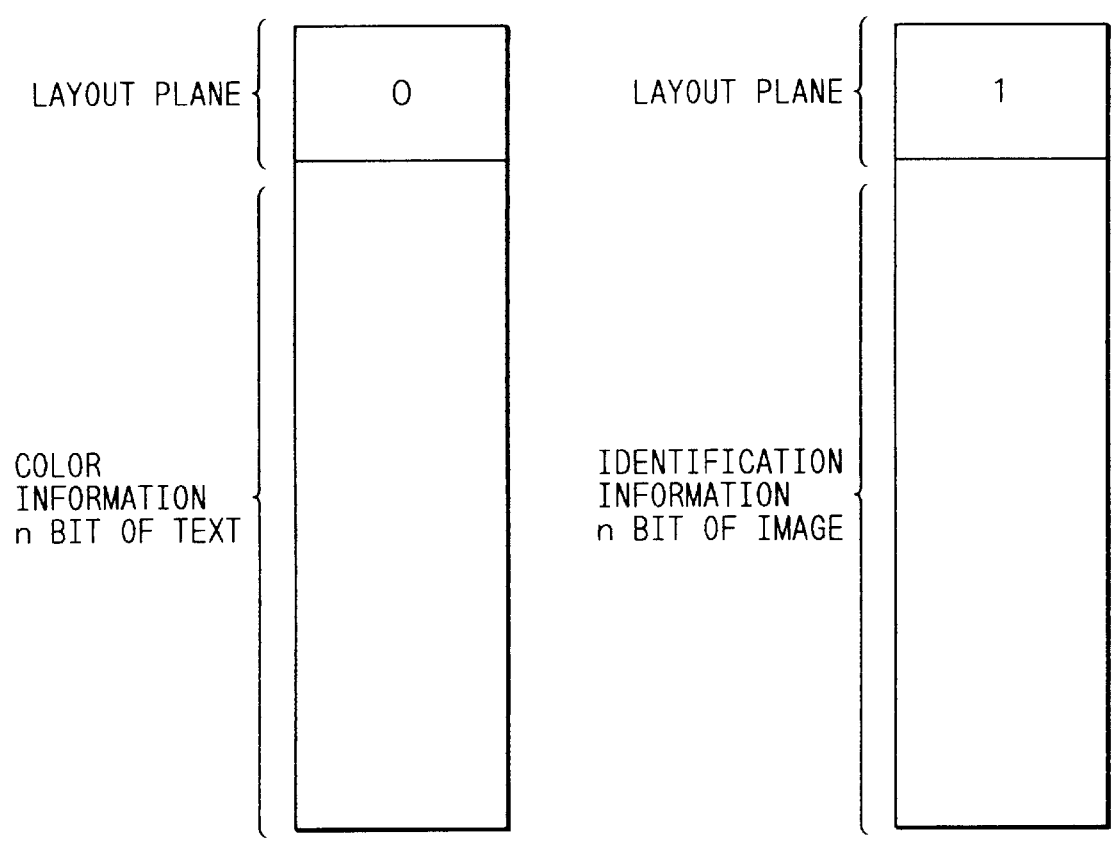

IMAGE MEMORY

IMAGE PROCESSING APPARATUS FOR TRANSMITTING COMPRESSED AREA INFORMATION TO BE USED IN EDITING

This application is a continuation of application Ser. No. 08/112,376 filed Aug. 27, 1993.

BACKGROUND OF THE INVENTION

1. Field of the Invention

The present invention relates to an image processing apparatus such as a host computer for transferring image information or an image output apparatus for forming images in accordance with image information.

2. Related Background Art

In a system in which a host computer is connected to a printer, one image output method is to transfer to the printer the program of a page descriptor language (to be abbreviated as a PDL hereinafter) formed by an application or the like of the host computer, develop the PDL into a bit image by a controller of the printer, and send the bit image to a printer engine, thereby outputting an image.

In the above method, in order to paste a natural image read by a scanner or the like into a line drawing described by, e.g., a graphic instruction of the PDL, information indicating the natural image is transferred as a file independently of the program of the PDL, and the program of the PDL containing a command for specifying the file and a command for specifying a position in which the natural image is to be pasted is transferred to the printer. The printer executes the pasting processing by decoding these commands.

Another output method is to develop the PDL into a bit image in the host computer and transfer the bit image to the printer, thereby outputting an image without executing any processing in the printer. This method requires, in the host computer, a CPU with a satisfactory processing capability, a memory with a large capacity, and a hard disk with a capacity large enough to temporarily store the developed bit image. An I/F with a speed high enough to send a bit image with a large capacity is also necessary between the host and the printer.

In order to paste the natural image into the line drawing by this method, the host computer holds information representing the natural image as a file and decodes the program of the PDL including a command for specifying the file and a command for specifying a position in which the natural image is to be fitted, thereby generating a bit map image in which the natural image is pasted in the line drawing. The bit map image thus formed is transferred to the printer.

The former method, however, has a drawback that the cost of the printer as a whole increases because the controller is incorporated.

The drawback of the latter method, on the other hand, is that the host computer is required to have a high processing ability, and a frame buffer for storing a bit image of one page is sometimes necessary on the printer side unless a special I/F with a very high transfer rate is used. This results in a very high cost of the memory. In order to transfer image data by using an I/F with a low transfer rate without providing any printer buffer on the printer side, a bit map image formed by the host computer may be compressed before being transferred to the printer and then expanded on the printer side. There has been proposed, however, no method of preferably compressing an image in which a natural image is pasted in a line drawing.

SUMMARY OF THE INVENTION

It is an object of the present invention to eliminate the drawbacks of the above conventional techniques and provide an image processing apparatus capable of transferring image information at a high efficiency.

In order to achieve the above object, an image processing apparatus of the present invention is characterized by comprising output means for outputting image information to be used in editing and area information for performing editing by using the image information, and transmitting means for transmitting the image information and the area information output from the output means, wherein the output means outputs the area information developed for each image in the form of compressed data.

In addition, an image processing apparatus of the present invention is characterized by comprising generating means for generating first image information representing a natural image, second image information representing a line drawing, and area information for performing editing by using the first image information and the second image information, and encoding means for synthesizing the second image information and the area information generated by the generating means and encoding the synthesized information.

Furthermore, an image processing apparatus of the present invention is characterized by comprising a host computer for processing image information, and a printer for forming a visible image of the image information processed by the host computer, wherein the host computer performs irreversible compression for image information representing a natural image in units of pixels and reversible compression for image information representing a line drawing in units of pixels, and transmits the compressed image information to the printer.

According to the present invention, in decoding and developing a page descriptor language containing a paste command for image information (to be referred to as to-be-pasted image information hereinafter) compressed as a file by irreversible coding or the like, this page descriptor language is developed into image information (i.e., line drawing information to be referred to as image information subjected to pasting with the to-be-pasted image information hereinafter) in a form not pasted with the above to-be-pasted image information. The image information subjected to pasting with the to-be-pasted image information can be compressed at a high efficiency by the irreversible coding. The to-be-pasted image information is compressed at a high efficiency with little image degradation by the irreversible coding.

The to-be-pasted image information and the image information subjected to pasting with the to-be-pasted image information, therefore, can be transferred efficiently because they are transferred separately.

A command contained in the page descriptor language program and indicating a position at which the to-be-pasted image information is to be pasted includes write start position information (a point at the upper right corner of the to-be-pasted image information), lateral width information, and longitudinal width information. A layout plane in the form of a bit map is formed by decoding these pieces of information. This layout plane can be compressed at a high efficiency by the same irreversible coding as of the image information subjected to pasting with the to-be-pasted image information.

If, therefore, a common encoding circuit is used time-divisionally, the image information subjected to pasting with the to-be-pasted image information and the layout plane can be encoded without providing any additional encoding circuit.

Other objects, advantages, and effects of the present invention will become apparent from the accompanying drawings, the following detailed description, and the appended claims.

BRIEF DESCRIPTION OF THE DRAWINGS

FIG. 9 is a block diagram showing the arrangement of the third embodiment of the present invention;

FIGS. 10A, 10B, and 10C are views for explaining a state in which an image to be pasted is rotated;

FIG. 14 is a view showing the relationship between the layout plane and the text information;

DETAILED DESCRIPTION OF THE PREFERRED EMBODIMENTS

The preferred embodiments of the present invention will be described in detail below with reference to the accompanying drawings.

(1st Embodiment)

The first embodiment of the present invention will be described below with reference to FIG. 1.

Figure 1:
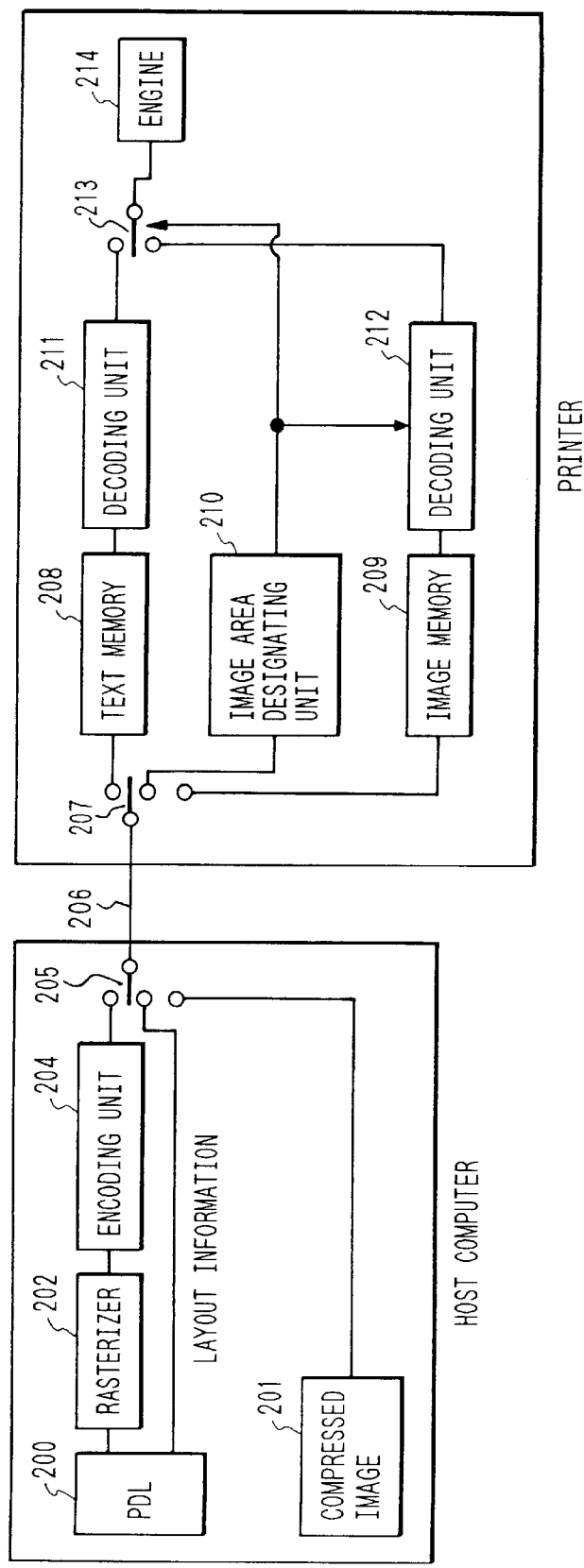
FIG. 1 is a block diagram showing the arrangement of the first embodiment of an image output system according to the present invention.

FIG. 1 is a block diagram schematically showing a system in which a host computer is connected to a printer by an interface cable 206. Assume that the host computer supplies to the printer a document containing characters or a line drawing (to be referred to as a text hereinafter) and a natural image (to be referred to as an image hereinafter) obtained by reading an original by using, e.g., an image reader, and the printer outputs this document. The text is generated by decoding the description of a PDL program 200. Image information is compressed by a compressing means at a high compression ratio and stored in a hard disk (201 in FIG. 1) of the host computer. An example of this compressing means is high-efficiency compressing means proposed by the JPEG (Joint Photographic Expert Group).

Figure 2:
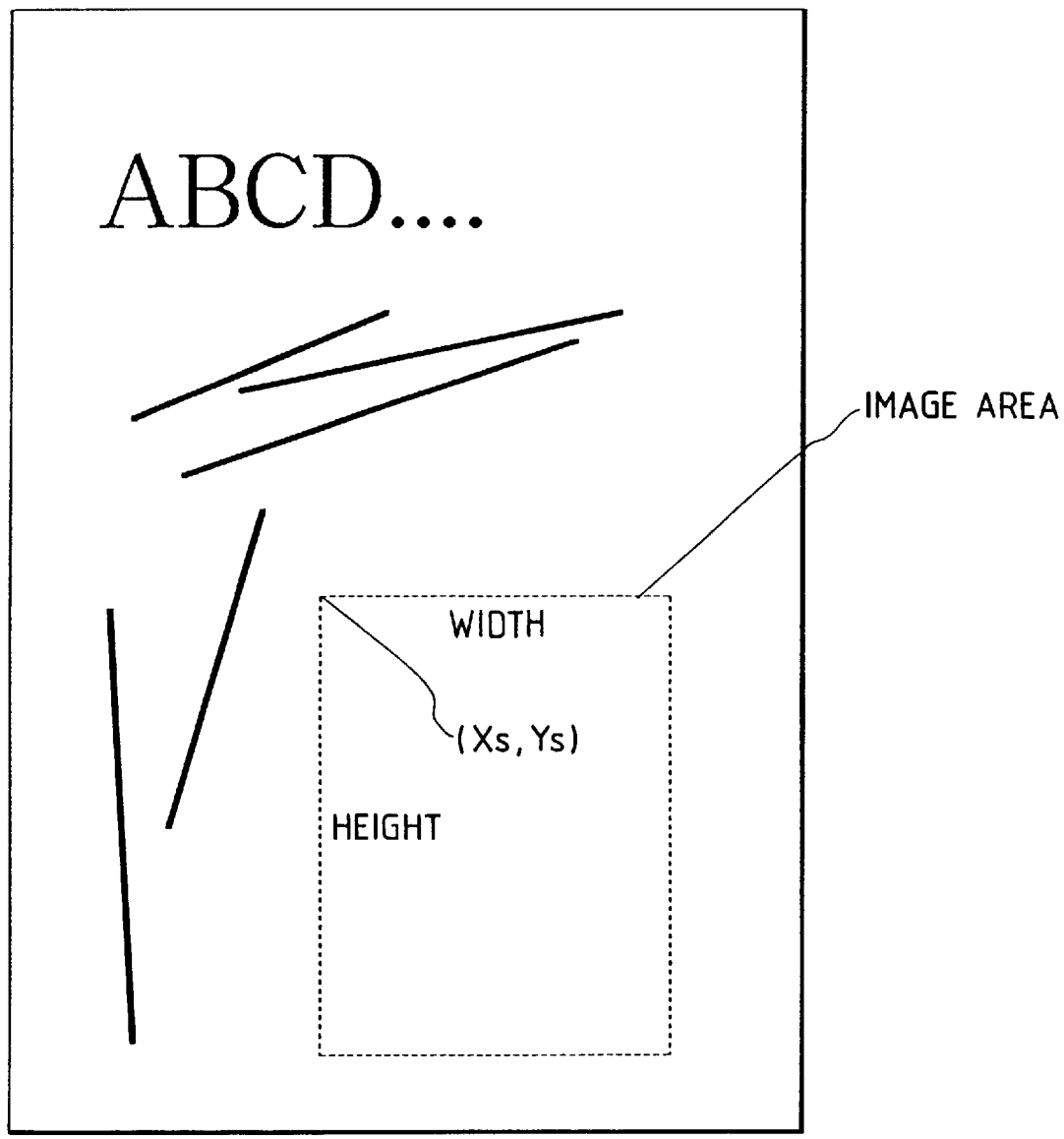
FIG. 2 is a view showing an example of a document to be formed.

The PDL program describes only layout information indicating a position of a page at which the image is to be pasted. As shown in FIG. 2, the layout information is designated by the write start position (the coordinate in a main-scanning direction: Xs, the coordinate in a sub-scanning direction: Ys) of the image, and the dimensions (the lateral width: WIDTH, the longitudinal width: HEIGHT) of the image. The PDL program is developed into a bit image by a rasterizer 202. At the same time, layout information of the image is generated by decoding the PDL program. At this point, however, no processing for pasting the image into the text is performed. The bit image information developed by the rasterizer is subjected to compression performed by an encoding unit 204 by using a coding scheme such as arithmetic coding or run-length coding suitable for the text.

The information of the text and the image thus compressed and the layout information of the image are selected by a selector 205 and transferred to the printer at a predetermined timing. A selector 207 of the printer is switched at a predetermined timing to store the text information in a text memory 208 and the image information in an image memory 209. The layout information is input to an image area designating unit 210.

Figure 3:
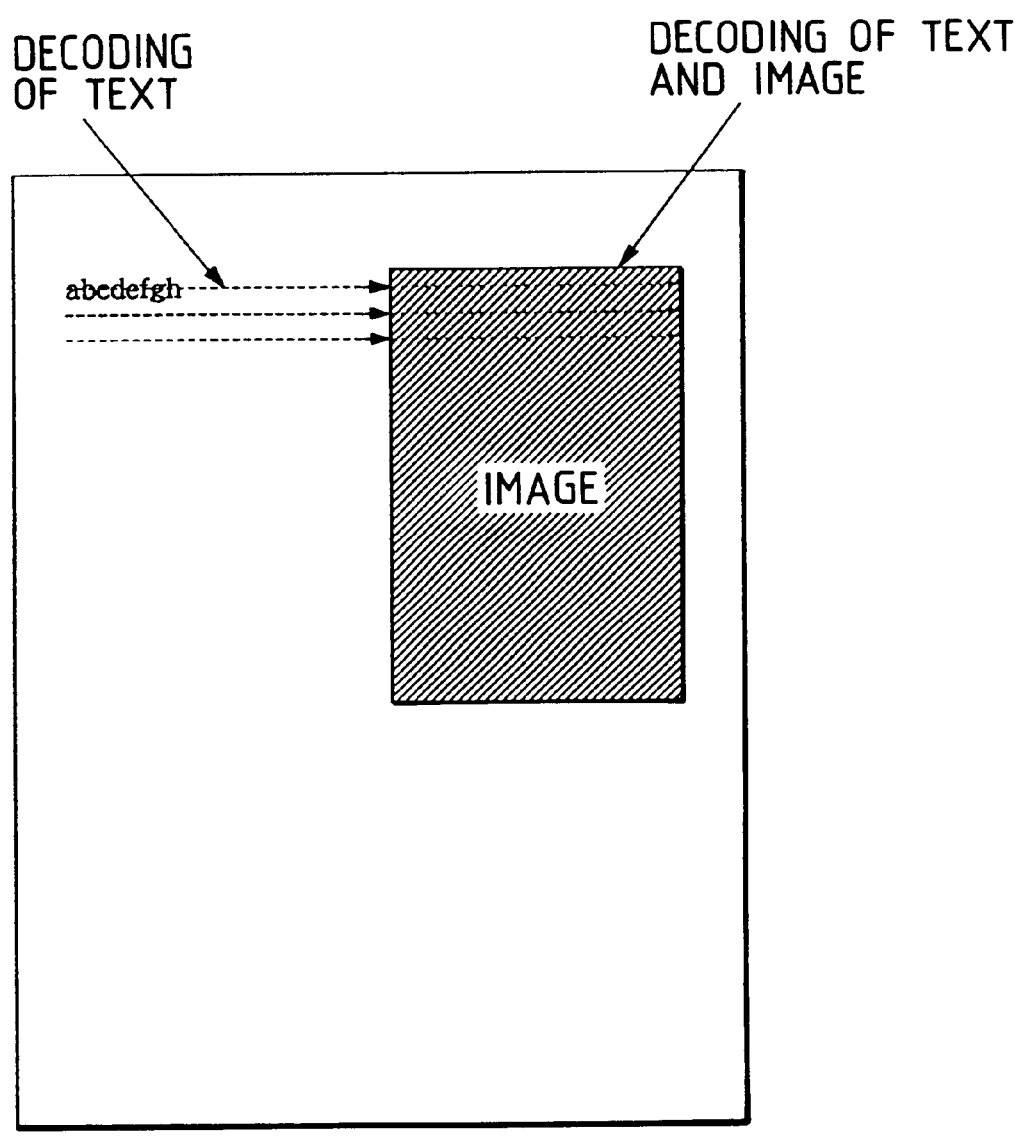
FIG. 3 is a view for explaining areas in which text information and image information are decoded.

The information of the compressed text and the information of the compressed image are decoded by decoding units 211 and 212, respectively. As shown in FIG. 3, the text is decoded constantly, but the timing of decoding of the image must be controlled because the image decoding is performed only in an image area. An image area designating unit 210 performs this control.

Figure 4:
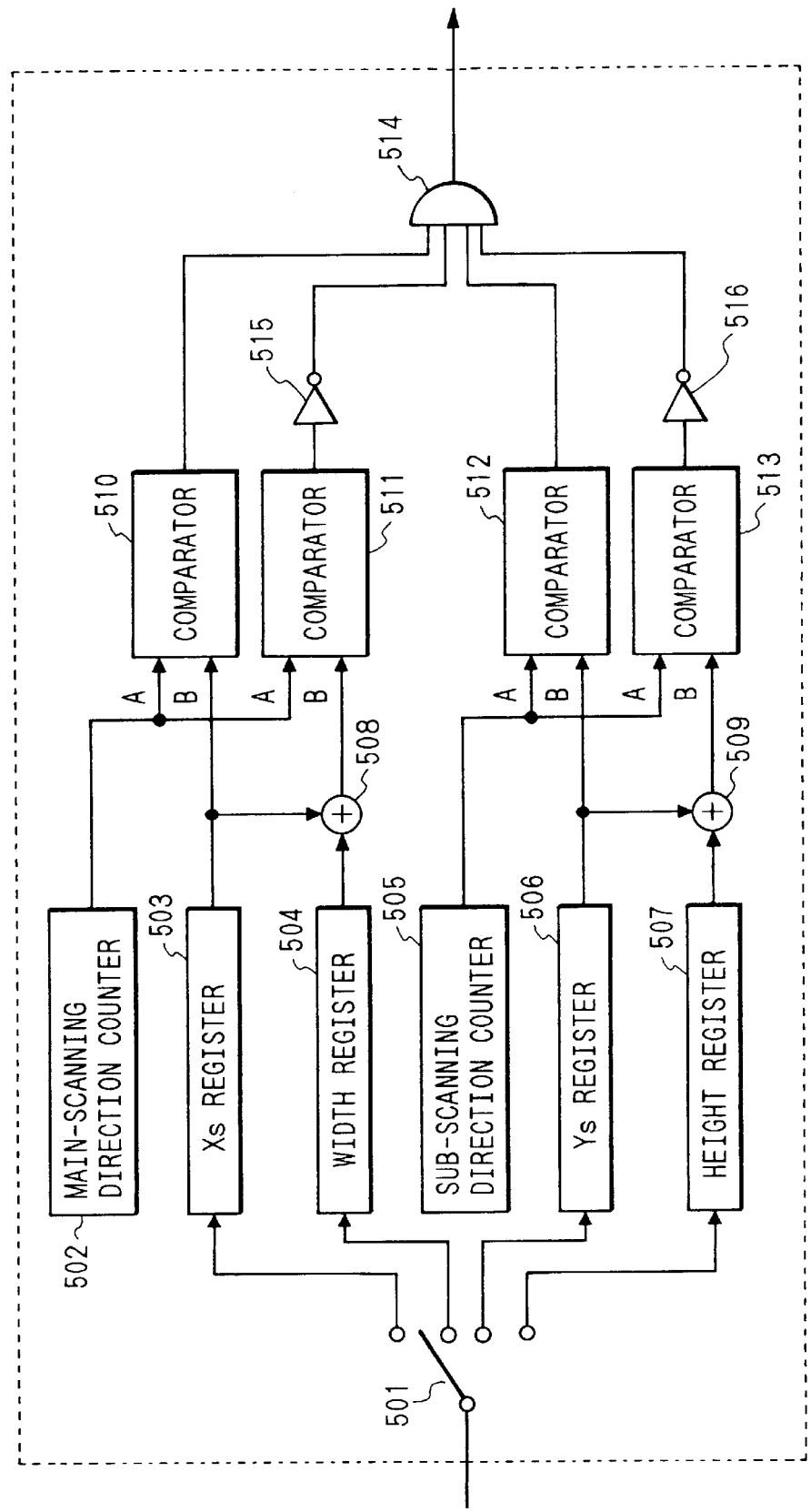
FIG. 4 is a block diagram showing the arrangement of an image area designating unit shown in FIG. 1.

FIG. 4 shows the details of this image area designating unit 210. A portion surrounded by dotted lines in FIG. 4 corresponds to the image area designating unit 210 shown in FIG. 1. Xs, Ys, WIDTH, and HEIGHT contained in the layout information input from the host computer are set in registers 503, 504, 506, and 507 by switching a selector 501 at predetermined timings. A main-scanning direction counter 502 and a sub-scanning direction counter 505 perform count operations as decoding proceeds. That is, the resultant counts represent coordinates in a page currently being decoded. The count of the main-scanning direction counter 502 and the value of Xs set in the register 503 are input to a comparator 510. If the count A and the value B of Xs satisfy A≧B, the comparator outputs a signal at level High. An adder 508 adds the data set in the registers 503 and 504 and inputs the sum to a comparator 511. If the count A and the sum B satisfy A≧B, the output from the comparator 511 goes High. This output is input to a NOT circuit 515. That is, the output signal from this NOT circuit 515 goes High only when A<B is established in the comparator 511. The identical processing is also performed in the sub-scanning direction. The resultant outputs from the comparators 510 and 511 and comparators 512 and 513 and the inverted signals of these outputs are input to an AND circuit 514. With the above processing, the output from the AND circuit 514 goes High only in the image portion represented as a hatched portion in FIG. 3. That is, the image area designating unit shown in FIG. 4 can generate a signal which goes High only while the image area is decoded, and the decoding unit 212 for decoding images shown in FIG. 1 can be controlled by using this signal. This signal is also input to a selector 213 to selectively supply the text information and the image information to a printer engine 214.

With the above arrangement, even if a document has both a text portion and an image portion, the information quantities of the text portion and the image portion can be reduced by the two discrete compressing means respectively suitable for compressing texts and images. This largely reduces the capacity of the frame buffer of the printer.

(2nd Embodiment)

In the system shown in FIG. 1, however, the configuration of the image area designating unit is complicated as shown in FIG. 4, and this sometimes increases the load of processing during decoding. In addition, in order to process a page having a plurality of images, it is necessary to prepare a plurality of registers for storing a plurality of pieces of layout information or to perform processing of temporarily storing a plurality of layout information in a memory and sequentially reading out the information from the memory. A plurality of counters and a plurality of comparators are also required, resulting in a complicated hardware arrangement in some cases.

Figure 5:
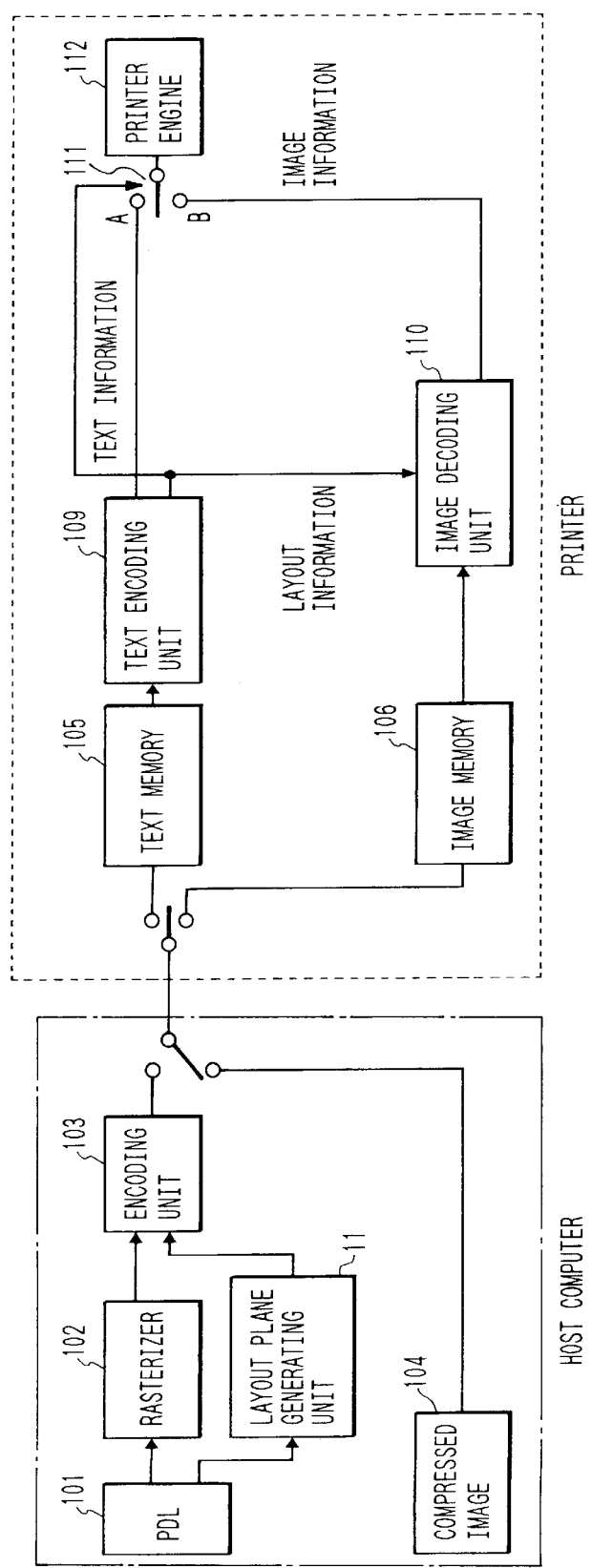
FIG. 5 is a block diagram showing the arrangement of the second embodiment of the present invention.

FIG. 5 is a block diagram showing the arrangement of the second embodiment of the present invention.

A PDL (page descriptor language) 101 is a block for describing document descriptor instructions for, e.g., characters, graphics, and images in a predetermined form of a language. In order to synthesize a natural image or an existing image file, such as CG (computer graphics), with characters and graphics in one page of a document, the PDL generates a description for designating an area in which the image to be synthesized is to be fitted.

A rasterizer 102 decodes the document descriptor instruction formed by the PDL 101 and converts the instruction into a dot indication signal. In this case, a text image need not be a binary one but may be a so-called multilevel text image having gradation information in each pixel. In the case of the multilevel text image, the circuit configuration need only be so designed as to hold bit maps in an amount required to express the gradation information in a one-to-one correspondence with bit planes.

For a portion designated as an image pasting area by the PDL 101, a layout plane indicating that area is generated (by a layout plane generating unit 11).

The generation of this layout plane is the characteristic feature of this embodiment.

The layout plane will be described with reference to FIG. 6.

Suppose, as an example of a document to be formed, that an image file is to be pasted in the same page as characters and graphics as shown in FIG. 2.

An area in which this image file is to be pasted is a portion surrounded by dotted lines. A bit map as shown in FIG. 6 is generated in accordance with a description concerning this image area in the PDL program. This bit map has the same resolution as that of a bit map developed by the rasterizer 102; that is, "1" is placed at each pixel in an area in which the image is to be fitted, and "0" is placed at each pixel in an area except for the image area.

Subsequently, an encoding unit 103 encodes the bit map generated by the rasterizer 102 and the layout plane generated by the layout plane generating unit 11 for the purposes of, e.g., shortening the transfer time in a transmission path (between a host computer and a printer) and reducing the capacities of memories required on the printer side. Although this coding scheme is not particularly limited, reversible coding, such as arithmetic coding or MMR, is preferred. Since the layout plane indicates only the image area, the number of change points is small, and so a very high coding efficiency can be expected. That is, an increase in code amount resulting from the addition of the layout plane is very small.

Assume, in this embodiment, that the image to be pasted in the designated area is an image file already formed by another application software and stored in a memory unit of the host computer after being compressed by a compression format of, e.g., the JPEG. The designated image file is transmitted to the printer without being decoded and, as in the first embodiment, stored in a image memory 106 incorporated in the printer.

The information (text information), such as characters and a line drawing, and the layout information both encoded by the encoding unit 103 are stored in a text memory 105 incorporated in the printer.

Suppose the capacity of each of the two types of internal memories of the printer is smaller than the full memory of one output page, that is:

(the number of all pixels of the maximum output size of the printer)×(the number of gradation levels per pixel)

In the printer, decoding of the text is started in synchronism with the output timing of a printer engine 112. The decoding and the output from the printer engine must be synchronized because it is difficult to stop the printing operation once the operation is started if the printer according to the present invention is, e.g., a laser beam printer, an LED printer, or a liquid crystal printer.

The decoding of the text memory is preferably not bit plane sequential decoding but pixel sequential decoding even if the character information or the graphic information is multilevel information.

The layout information is also processed as one bit information at the same pixel of the text information and is preferably decoded earlier by several pixels than the text information in actual processing.

The decoded layout information is transmitted to an image decoding unit 110. The image decoding unit 110 is a unit for decoding images compressed by the host computer and stored in the image memory of the printer.

The image decoding unit 110 starts decoding only when the layout information is "1", i.e., does not perform decoding when the layout information is "0".

The same layout information is also transmitted to a switch 111. When the layout information is "0", the switch 111 is closed to a terminal A to select output of the text information. When the layout information goes to "1", the switch 111 is closed to a terminal B to select output of the decoded image information.

As described above, holding all the pixels of the layout information by the bit map makes switching between the text information and the image information very easy.

Other effects obtained by this embodiment will be described below.

Figure 7:
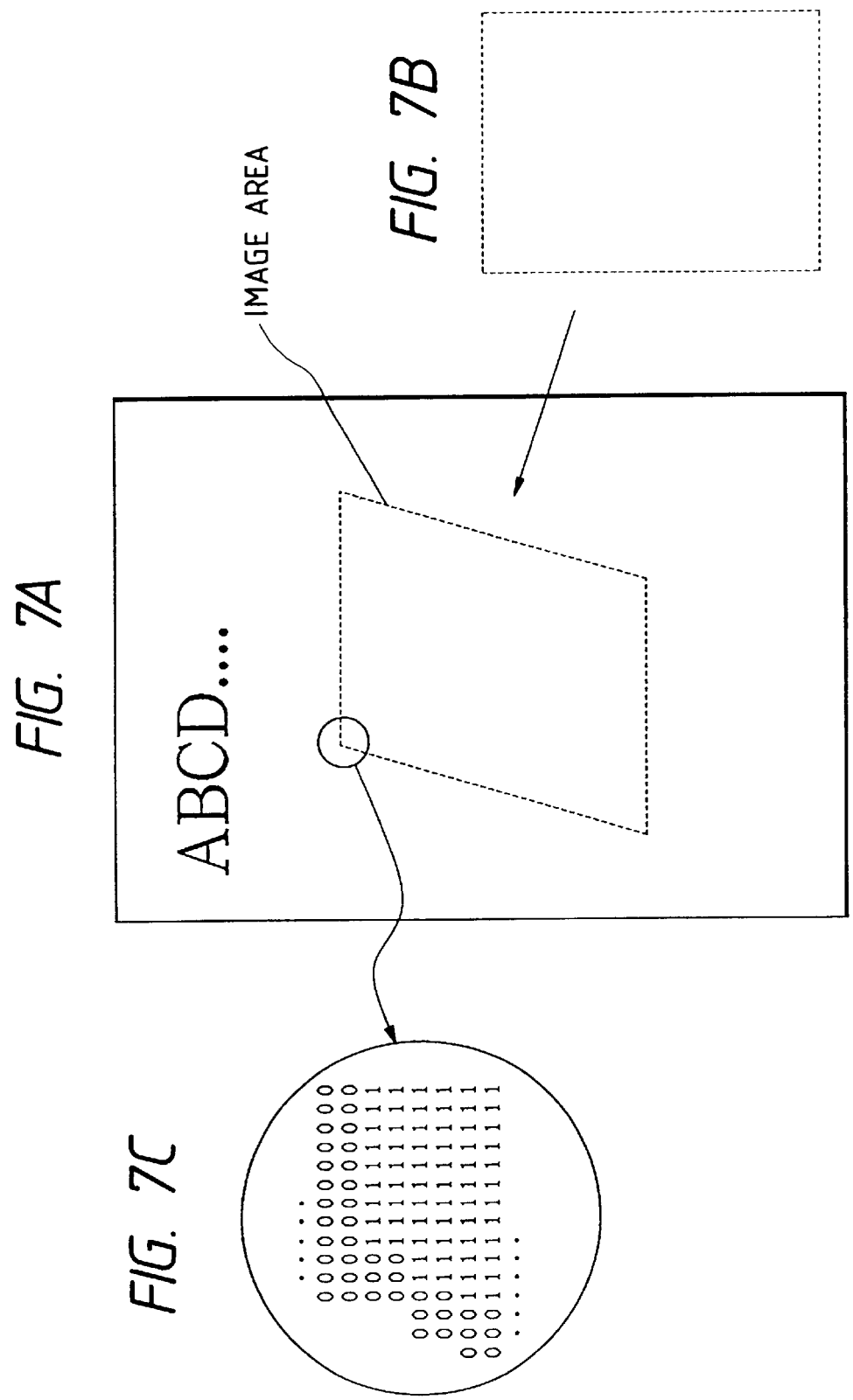
FIGS. 7A, 7B, and 7C are views for explaining a state in which an image to be pasted is varied.

FIG. 7A shows a document to be formed by the host computer in the same manner as described above. Assume that an existing image file formed by another application software is also to be pasted in the same page as characters and graphics in this document to be formed. This image file is originally a rectangular image as shown in FIG. 7B and stored in the storage unit of the host computer after being encoded by a compression scheme of, e.g., the JPEG.

Assume the image is varied on the document to be formed as indicated by dotted lines in FIG. 7A. FIG. 7C illustrates a portion (the start position of an area of the image to be fitted) of a layout plane representing this varied image area. Referring to FIG. 7C, a portion where "1"s are arranged indicates the image pasting area, and a portion where "0"s are arranged indicates an area except for the image pasting area. In this manner, even if an image is thus varied, generating the layout plane makes it possible to transmit an image file other than a rectangular image to the printer while the file is kept compressed, which is difficult to perform by conventional systems.

Figure 8:
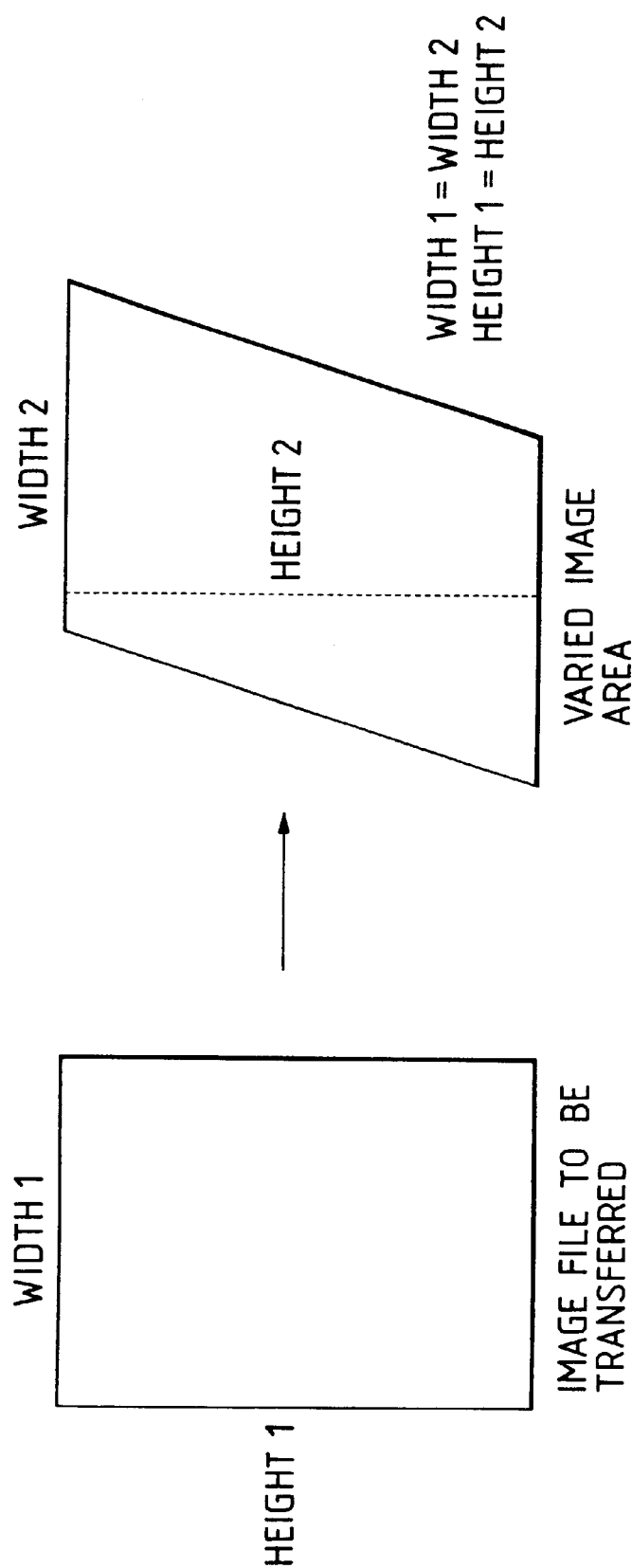
FIG. 8 is a view for explaining the varying conditions in FIGS. 7A to 7C.

Such variation, however, is based on the assumption, as shown in FIG. 8, that the lateral width (WIDTH) and the longitudinal width (HEIGHT) of the image remain unchanged after the variation, and an order of transfer of pixels of the image is the same as a raster order after the variation.

The printer need only decode the image in accordance with layout information in the same manner as described above such that the decoded image information is pasted in a portion in which the layout plane is "1". This effect, therefore, can be realized by the same arrangement as described above.

(3rd Embodiment)

FIG. 9 shows the third embodiment of the present invention. This embodiment realizes rotation of an image which is difficult to perform in the above embodiments.

FIG. 10A illustrates a document to be formed in this third embodiment, in which a portion surrounded by dotted lines indicates an image to be fitted. As in the above embodiments, an image file which is originally the one shown in FIG. 10B is rotated by application software and fitted.

FIG. 10C shows a portion of a layout plane. Referring to FIG. 10C, points indicated by "1" represent pixels in which the image file is to be fitted, and points indicated by "0" represent other pixels.

In this document to be formed, since the image to be pasted is rotated as described above, the raster direction of the image file stored is different from the raster direction after the image is fitted. To realize this processing by using the arrangement shown in FIG. 5, therefore, it is necessary to provide a large-capacity buffer memory in the printer to develop and store the decoded image information in pixel positions corresponding to the layout plane in the buffer memory. This extremely increases the load of the printer.

For this reason, the arrangement shown in FIG. 9 is used in this embodiment.

Referring to FIG. 9, a compressed image 2104 indicates an image compressed by a compression scheme of, e.g., the JPEG, as in the second embodiment described above. A decoding unit 2051 is a unit for decoding this compressed image, which decodes the image in a host computer.

An encoding unit 2052 encodes the image information once decoded.

This encoding unit 2052 performs coding in accordance with not a coding scheme in which coding is performed in units of blocks, such as the scheme employed by the JPEG but a coding scheme, such as DPCM, in which coding can be performed in units of pixels. An order of pixels to be encoded is not an order in the raster direction of the stored image but an order in the raster direction of the rotated image.

Figures 11A, 11B, 13:
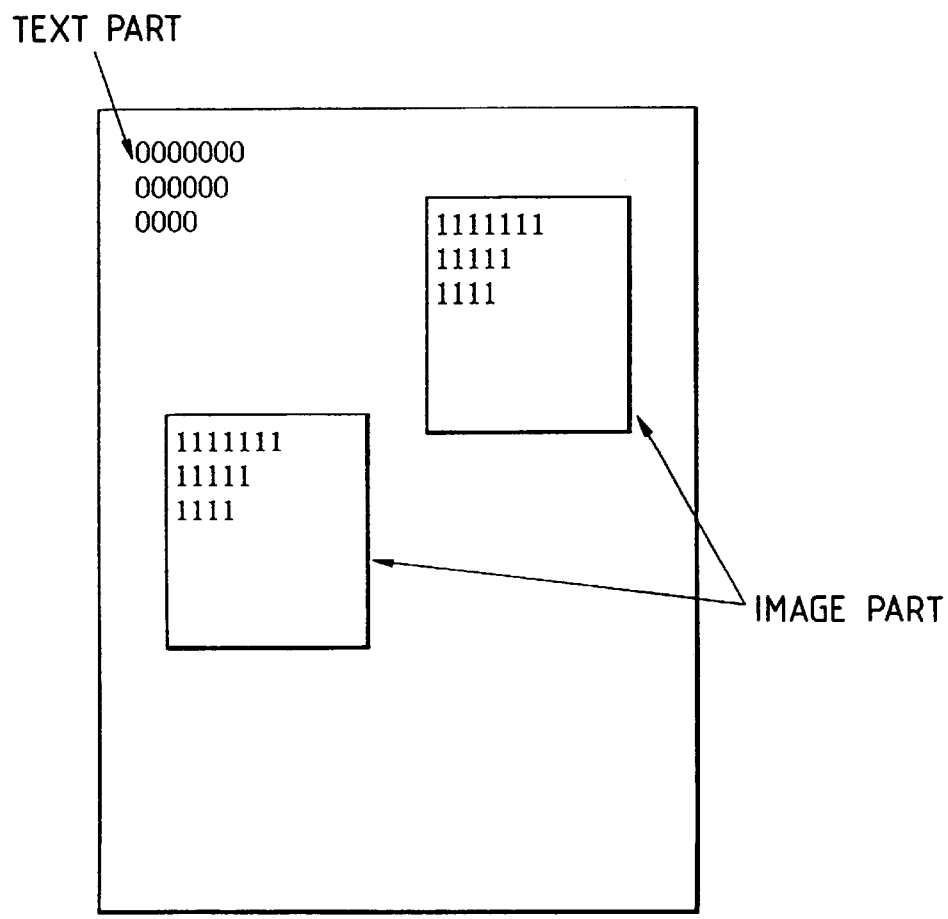
FIGS. 11A and 11B are views for explaining an order of pixels to be encoded.
FIG. 13 is a view for explaining a layout plane.

This order of pixels will be described below with reference to FIGS. 11A and 11B. FIG. 11A is a view similar to FIG. 10C, in which a portion of the layout plane formed by the document shown in FIG. 10A is illustrated. FIG. 11B shows an order of pixels to be encoded in accordance with the input information of this layout plane.

An image decoding unit of the printer is of course a decoding unit corresponding to the encoding unit 2052.

The arrangement of this embodiment can realize not only rotation but also any variation of an image.

In addition, the compressed image 2104 is already compressed before being stored in this embodiment, but the image need not be the compressed one. In such a case, the decoder 2051 is unnecessary in this embodiment.

(4th Embodiment)

In the fourth embodiment of the present invention, to obtain layout information of a plurality of image parts, text data is added to a layout plane for designating the locations of the image portions in a host computer and then transferred to a printer. The printer has a unit for controlling decoding of the image by using the information of the layout plane when the decoding is performed. This arrangement of the fourth embodiment facilitates decoding processing in the printer and also simplifies the hardware configuration.

Figure 12:
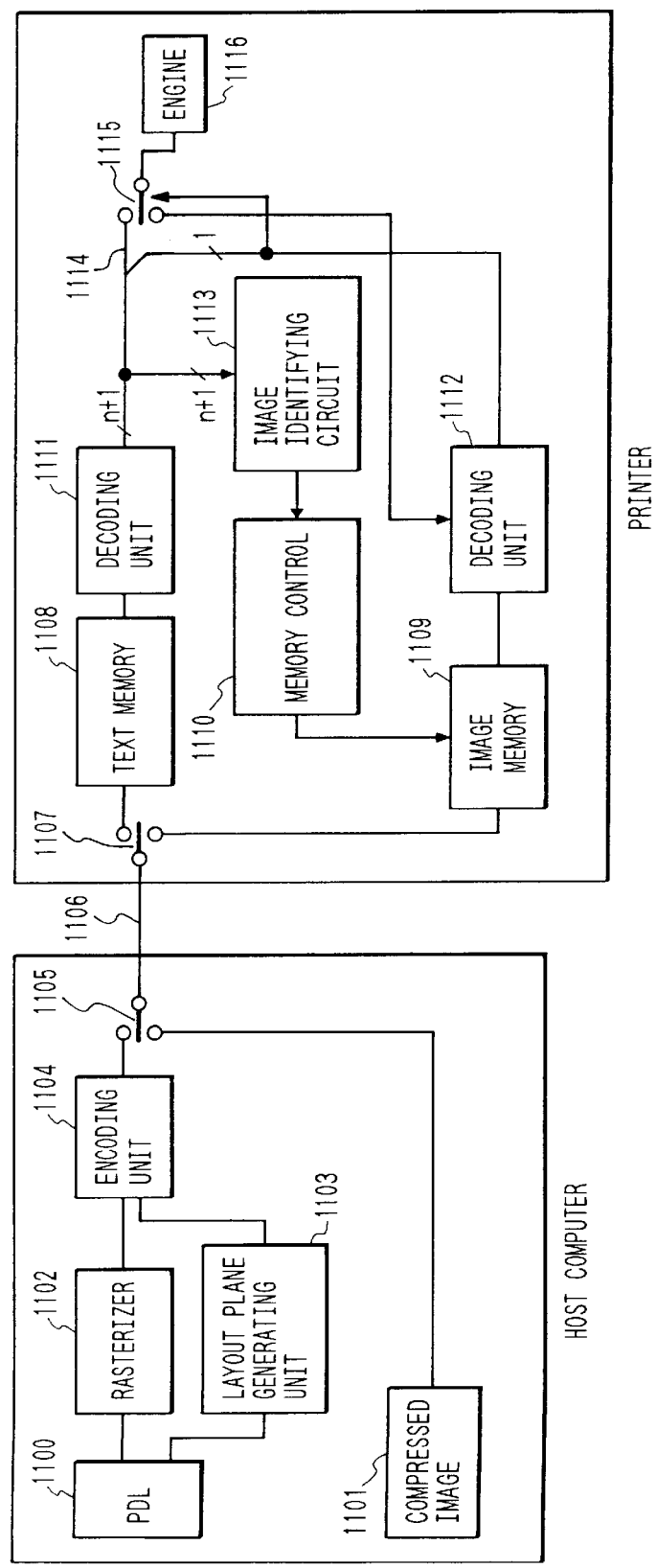
FIG. 12 is a block diagram showing the arrangement of the fourth embodiment of the present invention.

FIG. 12 is a block diagram showing an image output apparatus according to the fourth embodiment of the present invention. FIG. 12 illustrates a system in which the host computer is connected to the printer in the form of simple blocks as in FIG. 5. Blocks having the same functions as in FIG. 1 are not particularly explained in this embodiment.

The layout information of an image described in a PDL is applied to a layout plane generating unit 1103. The layout plane is a bit plane constituted by 1-bit pixels, as shown in FIG. 13, in which a text area has level "0" and an image area has level "1". The layout plane generating unit 1103 generates this layout plane in accordance with the input layout information. Even if a plurality of images are present, image areas are formed on one bit plane from the layout information of the individual images as shown in FIG. 13.

The layout plane thus generated is input to an encoding unit 1104 and compressed by using reversible coding, such as arithmetic coding or run-length coding, like the text part. The layout plane can be compressed at a high compression ratio even by the reversible compression as described above because of the nature of the layout plane. Therefore, the information quantity of the layout information itself to be transferred to the printer is very small.

The layout plane is encoded by using (n+1) bits obtained by adding one bit of the information of the layout plane to n bits indicating the color information of the text, as shown in FIG. 14. The text and the layout plane are stored together in a text memory 1108 even after being encoded. In the addition of this layout plane, if the bit of the layout plane is 0 as shown in FIG. 14, i.e., if the pixel indicates a text, the color information of the text is set in n bits of the text part. If the bit of the layout plane is 1, i.e., if the pixel indicates an image, no color information is necessary because a compressed image 1101 contains color information provided that overlap of the image and the text is not taken into account. Therefore, by taking into consideration a case in which a plurality of images are to be pasted, information for identifying a plurality of images is added to the text part. A rasterizer 1102 performs processing of adding this identification information. The image identification information is, for example, information having an order of transfer of images from the host computer in the form of numerical values. That is, the information by which the printer can identify uniquely a plurality of images is set in place of the color information of the text. In this arrangement, a method of identifying images naturally requires providing an identifying means in the printer.

The information of the text and the information of the image both compressed by the host computer are stored in respective corresponding memories of the printer. In this case, the image may be stored in a hard disk or the like of the host computer after being compressed as described above in the conventional examples. Alternatively, an uncompressed image may be subjected to rasterization and compression at the same time while being transferred to the printer.

The text, the image, and the layout plane are decoded by decoding units 1111 and 1112. The decoding unit 1111 performs decoding constantly. The (n+1)-bit text information and the layout plane decoded by the decoding unit 1111 are supplied to an image identifying circuit 1113.

Figure 15:
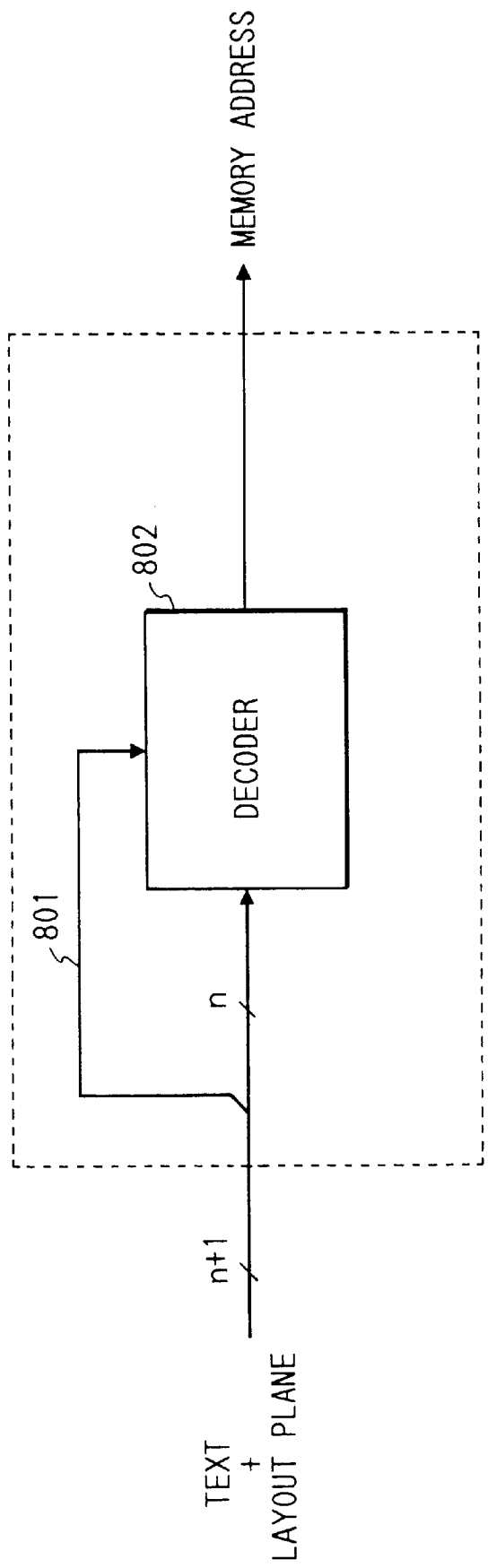
FIG. 15 is a block diagram showing the arrangement of an image identifying circuit according to the fourth embodiment.
Figure 16:
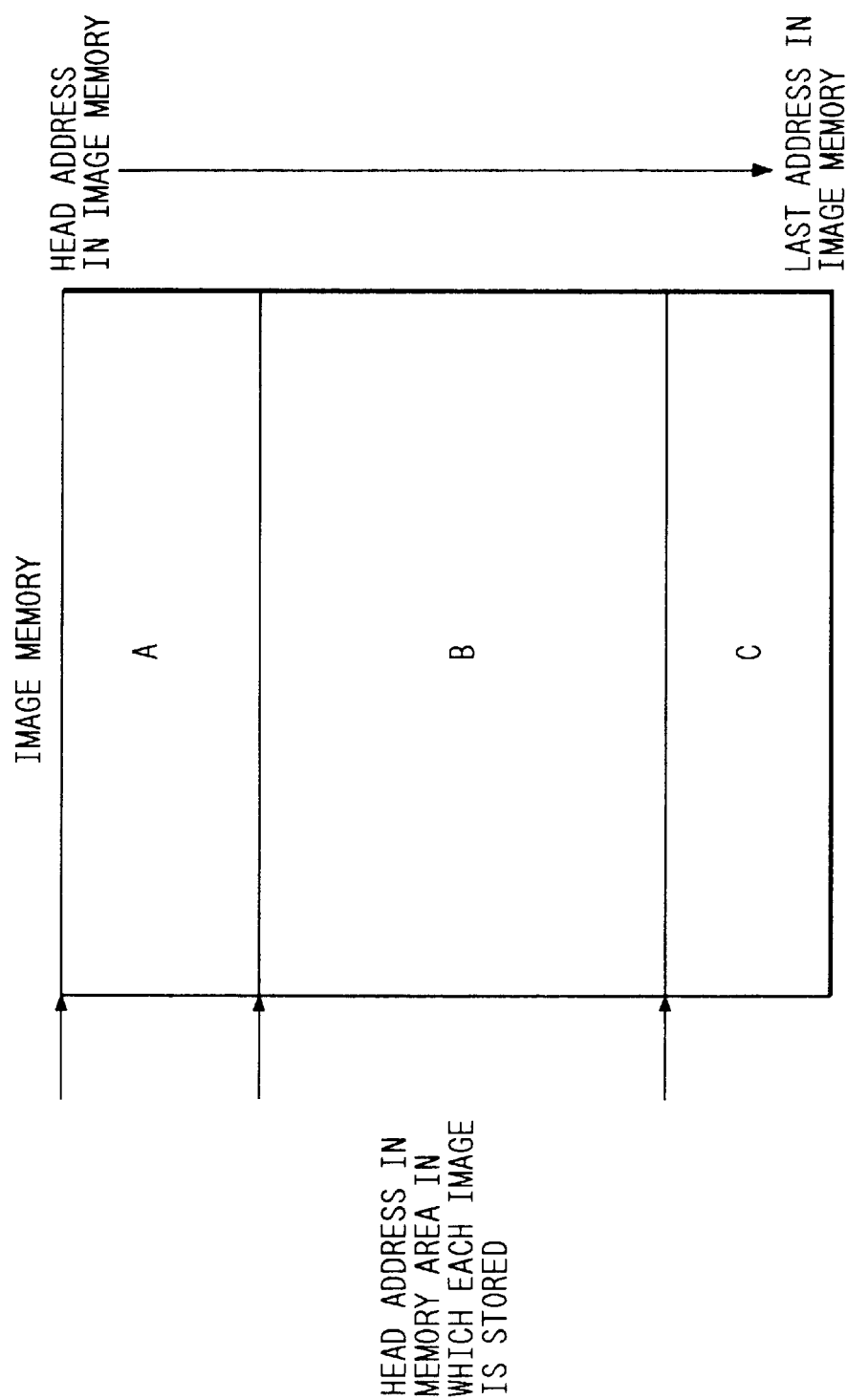
FIG. 16 is a view showing the way a plurality of pieces of image information are stored in an image memory.

FIG. 15 is a block diagram showing the image identifying circuit 1113. Of the input information of the text and the layout plane, n bits of the text information are applied to a decoder 802. Simultaneously, 1-bit data of the layout plane is also input to the decoder 802 through a signal line 801. In this case, control is performed such that the decoder 802 operates when the signal is High, i.e., when the image is to be decoded. In accordance with the image identification method described above, when the number supplied from the host computer is the value of the image identification information, the decoder 802 outputs a memory address indicating a position of the image memory at which an image of the number designated by that value is stored. Assume that three images A, B, and C are transferred in this order from the host computer and stored in the image memory as shown in FIG. 16. In decoding the image A, a value "1" is set in the image identification information. On the basis of this value, the decoder 802 shown in FIG. 15 outputs the head address of a memory area of an image memory 1109 shown in FIG. 12 in which the image A is stored. The same processing is performed in identifying the remaining images B and C.

The output memory address signal from the image identifying circuit 1113 is input to a memory control unit 1110. In this memory control unit 1110, pointers indicating memory areas in which individual images are stored are managed in units of images. The memory control unit 1110 with this function determines which image is to be read in accordance with the input address information, and outputs a memory address indicating a pointer corresponding to the image thus determined. This memory address is input to the image memory 1109, and data of the corresponding image is read out from the memory and input to the decoding unit 1112.

The layout plane is also used in controlling image decoding. That is, one bit of the layout plane information is input from a signal line 1114 to the image decoding unit 1112. Since data of the layout plane is "0" in the text part, no image decoding is performed for that part. Since, on the other hand, data of the layout plane is "1" in the image part, image decoding is performed for the image part. The layout plane is also input to a selector 1115 to selectively output the decoded data of the text and the image to a printer engine 1116.

According to this embodiment, the layout information required in decoding of images can be obtained easily with a simple hardware configuration.

(5th Embodiment)

Figure 17:
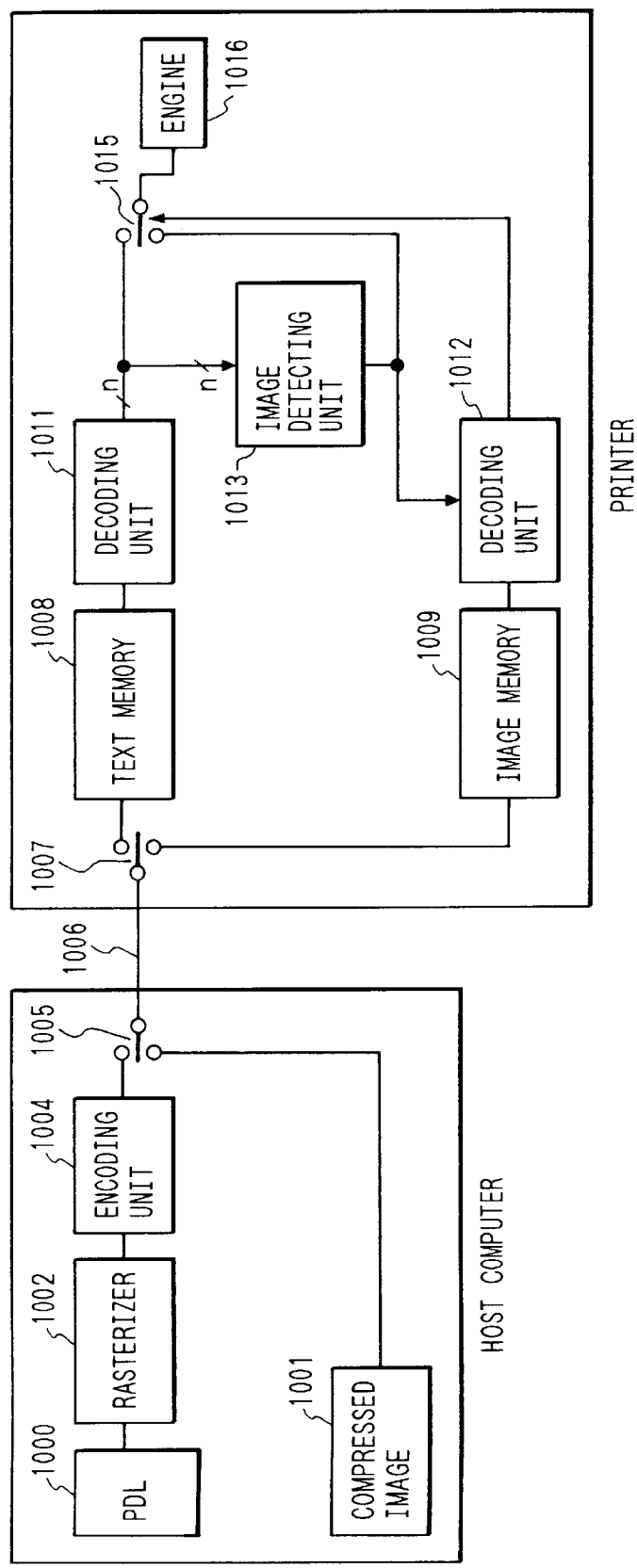
FIG. 17 is a block diagram showing the arrangement of the fifth embodiment of an image output system according to the present invention.

FIG. 17 is a block diagram showing the fifth embodiment of the present invention. FIG. 17 illustrates in the form of simple blocks a system in which a host computer is connected to a printer in the form of simple blocks, like FIG. 12 showing the fourth embodiment. Blocks with the same functions as in the fourth embodiment are not particularly described in this embodiment.

Figure 6:
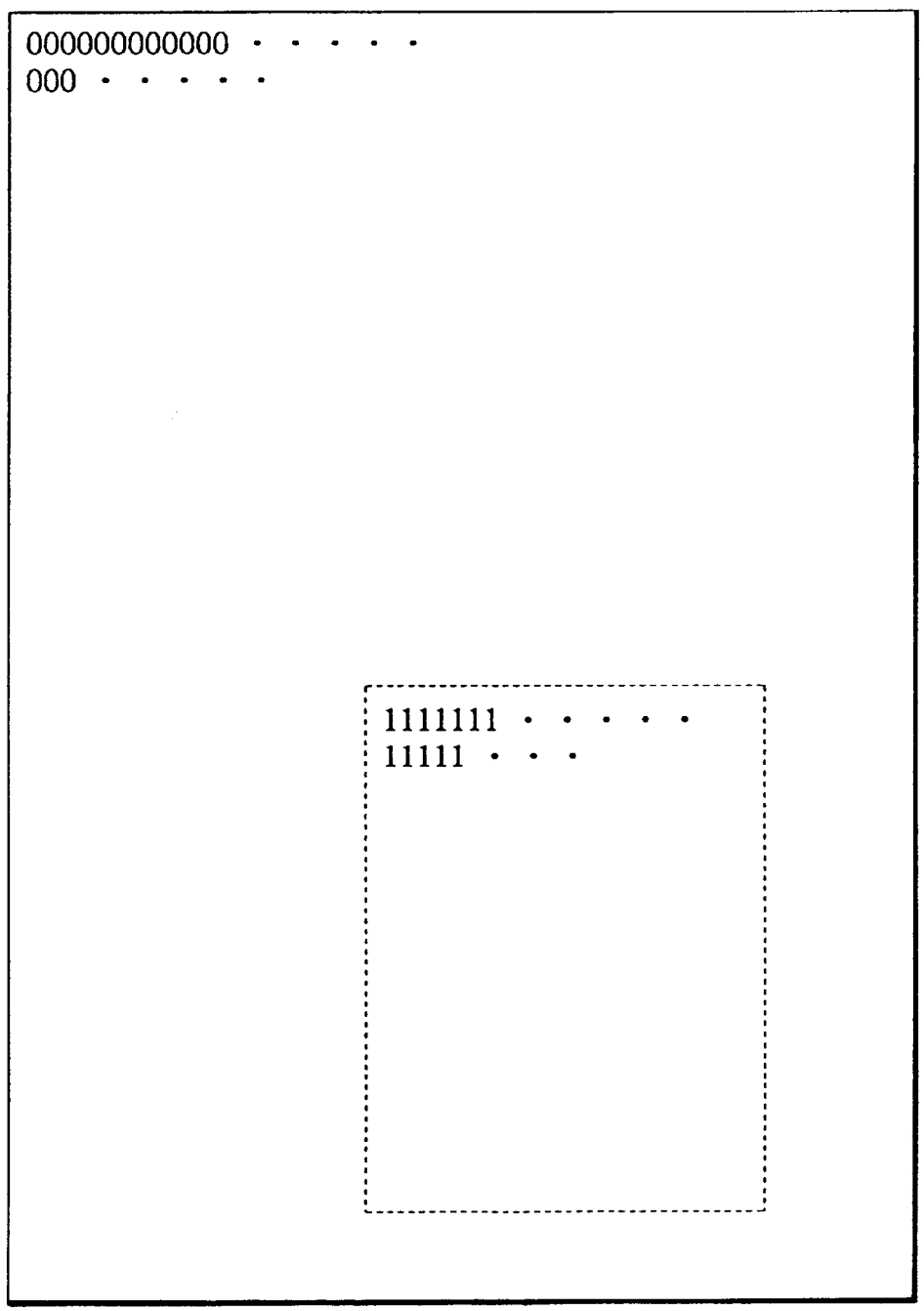
FIG. 6 is a view for explaining a layout plane.
Figure 18:
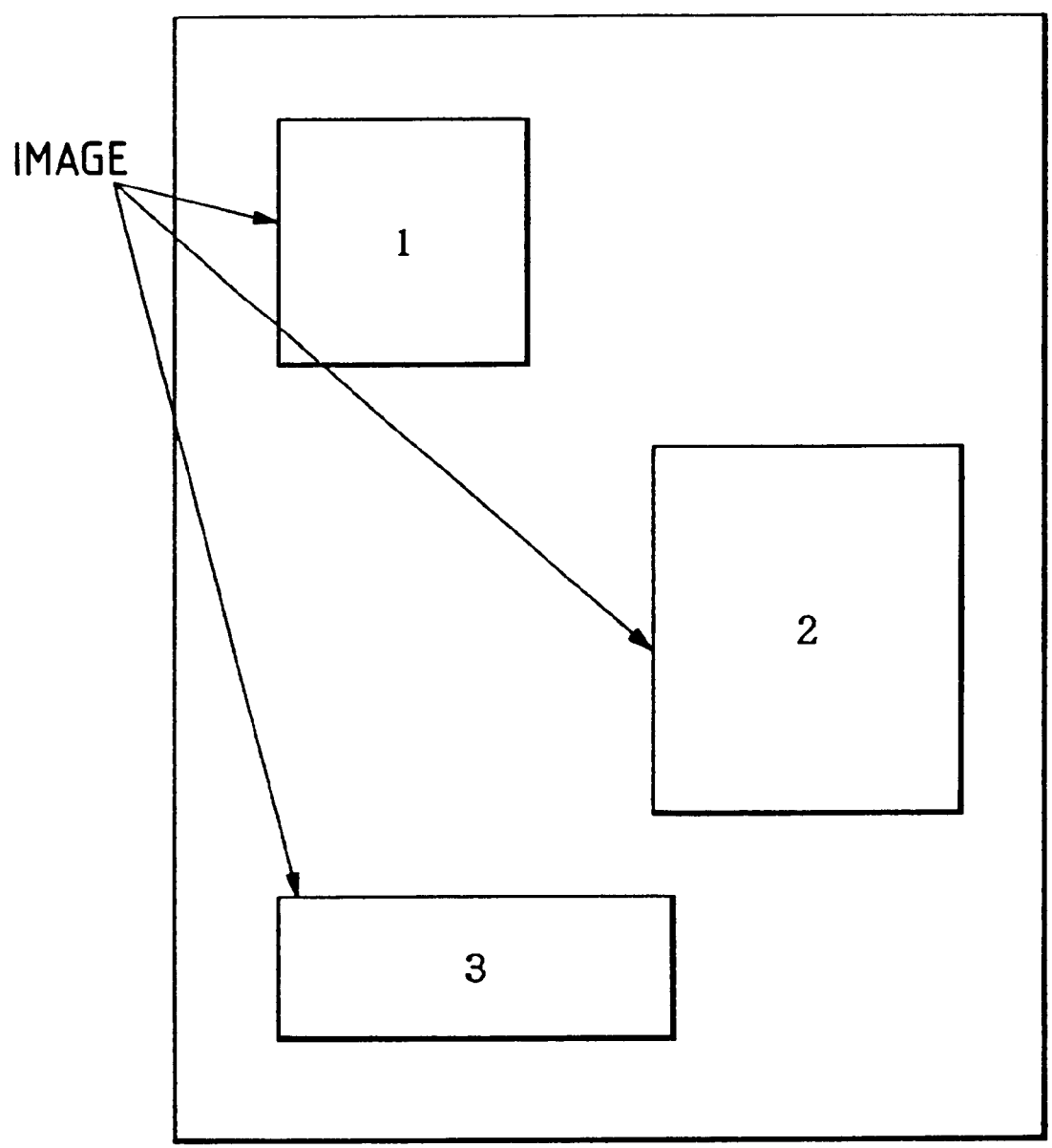
FIG. 18 is a view showing an order of transfer of a plurality of images according to the fifth embodiment.

In outputting a plurality of images, if images are present on the same line in the main-scanning direction as shown in FIG. 6, the image identifying processing as in the fourth embodiment described above must be performed. If, on the other hand, no images overlap in the main-scanning direction as shown in FIG. 18, these images are transferred from the host computer in an order of numbers shown in FIG. 18. In this case, when these images are to be decoded in the printer, they can be read out in the order by which they are stored in an image memory, so the above image identifying processing need not be performed. Since, however, it is necessary to designate image areas in outputting the document, one color of text color information is used as information for designating the image areas in this embodiment. For example, when data indicating the text color information consists of n bits, $2^n$ colors can be expressed. Since one of these colors is assigned as the information for designating the image areas, a total of $2^n - 1$ colors can be expressed.

A rasterizer 1002 shown in FIG. 17 develops the text part of the text information into a bit image and, in the image part, assigns a predetermined color (e.g., white) of the text color information as the information for detecting the image areas.

As in the fourth embodiment, the text information and the compressed image subjected to the encoding processing are transferred to the printer and stored in a text memory 1008 and an image memory 1009, respectively. The text information and the compressed image are decoded by decoding units 1011 and 1012, respectively, when the document is to be output. Decoding of the text is performed constantly, and the decoded result is input to an image detecting unit 1013. The image detecting unit 1013 detects the color (to be referred to as an image area color hereinafter) assigned to detect image areas by the host computer. Upon receiving the image area color, the image detecting unit 1013 supplies a control signal to the image decoding unit 1012, performing decoding of the images. This control signal is also input to a selector 1015 to selectively output the text information and the image information to a printer engine 1016.

With the above arrangement of this embodiment, image areas can be designated by assigning one color of the text color information because no image identification need be performed if images do not overlap in the main-scanning direction. In this embodiment, the function of the layout plane is executed by the image area color, so the layout plane need not be transferred in addition to the text information. As a result, the memory capacity can be reduced accordingly.

(6th Embodiment)

Figure 19:
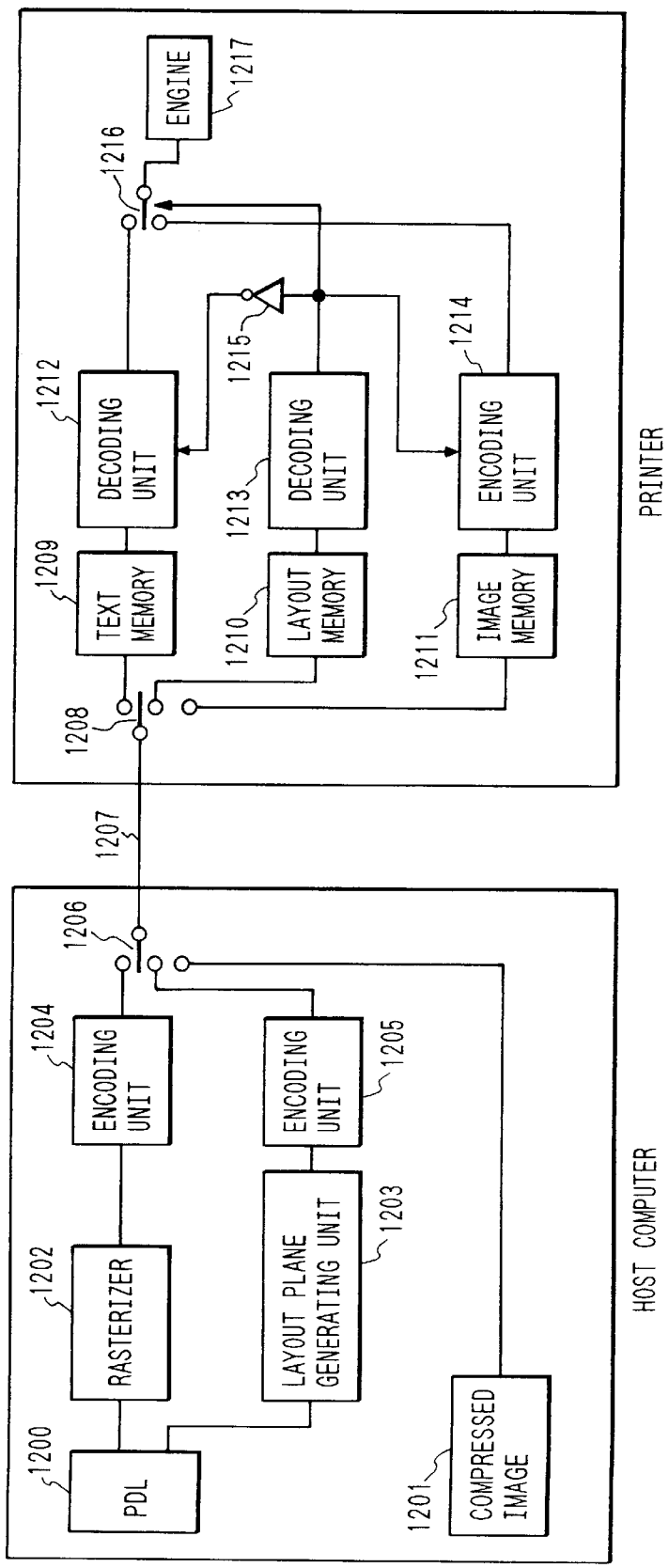
FIG. 19 is a block diagram showing the arrangement of the sixth embodiment of an image output system according to the present invention.

FIG. 19 is a block diagram showing the sixth embodiment of the present invention. FIG. 19 illustrates in the form of simple blocks a system in which a host computer is connected to a printer, like FIG. 12 showing the forth embodiment. Blocks with the same functions as in the second embodiment are not particularly described in this embodiment.

Figure 20:
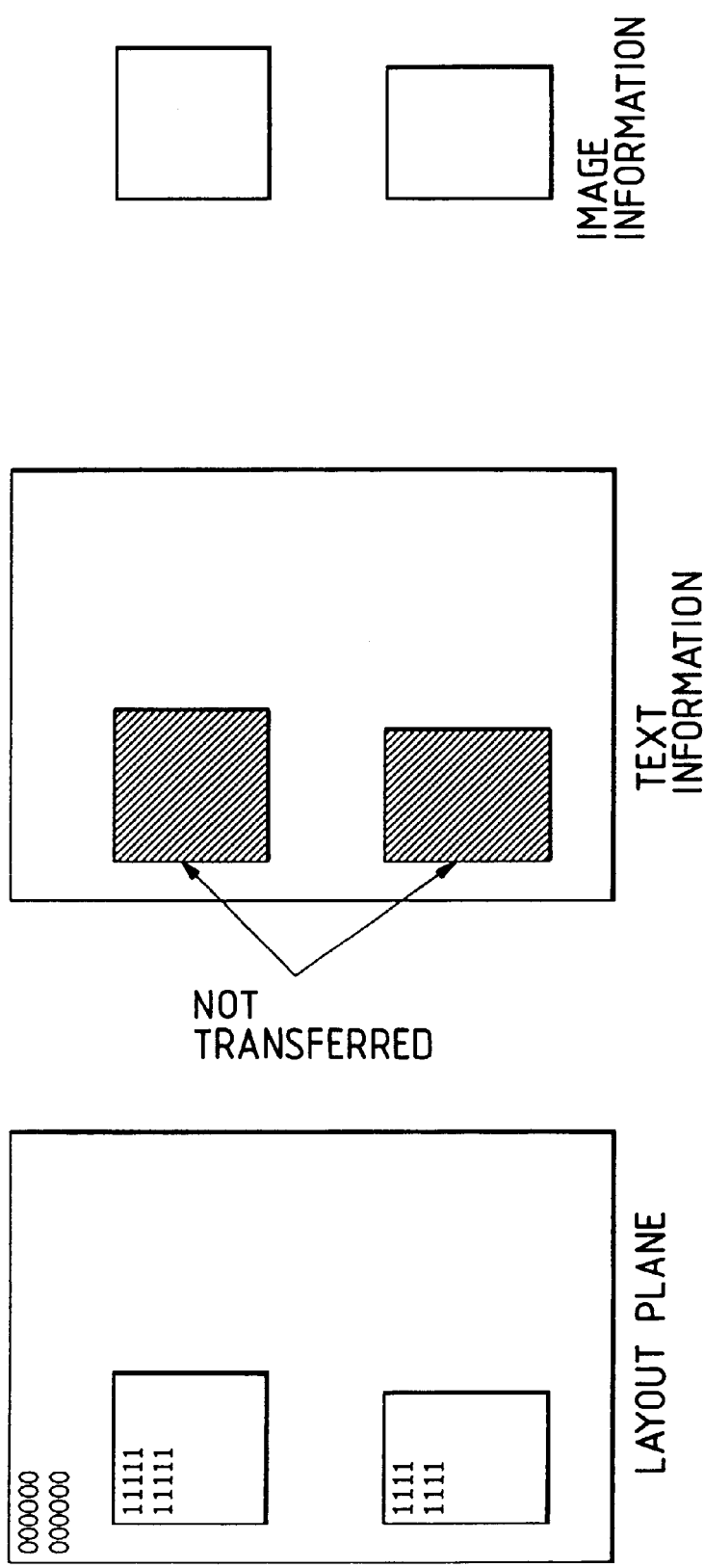
FIG. 20 is a view showing all information to be transferred according to the sixth embodiment.

In outputting a plurality of images, these images need not be discriminated from one another if they do not overlap in the main-scanning direction as in the fourth embodiment. In this embodiment, therefore, transfer of image part information of text information is omitted by the use of a layout plane. This can reduce a whole information quantity transferred from the host computer to the printer. That is, as shown in FIG. 20, nothing is transferred as data for areas indicated by hatched portions in the text information.

Referring to FIG. 19, as in the fourth embodiment, layout information described in a PDL 1200 is input to a layout plane generating unit 1203 to generate a layout plane. This layout plane is encoded by an encoding unit 1205, and the encoded data is transferred together with texts and images to the printer. These text data, layout plane data, and image data are stored in a text memory 1209, a layout memory 1210, and an image memory 1211, respectively.

In performing decoding, a decoding unit 1213 for decoding layout planes operates constantly. The decoded result is applied to decoding units 1212 and 1214 for decoding texts and images, respectively, thereby controlling decoding. That is, when the text part is to be decoded, "0" is output as the data of the layout plane. Therefore, a NOT circuit 1215 supplies a signal at level "High" to the decoding unit 1212, starting decoding of the text information. At this point, the decoding unit 1214 for decoding images performs no decoding because a signal at level "Low" is input. When the image information is to be decoded, "1" is output as the data of the layout plane. Therefore, a signal at level "High" is input to the image decoding unit 1214, and, in contrast, a signal at level "Low" is input to the text decoding unit 1212, thereby executing decoding of the image information alone. The layout plane is also input to a selector 1216 to selectively output the text information and the image information to a printer engine 1217.

With the above arrangement of this embodiment, the use of the layout plane makes it possible to control decoding of the text information and the image information performed in the printer. This makes transfer of the image part text information unnecessary, reducing a quantity of information to be transferred and also reducing the capacity of the memory for storing texts.

(7th Embodiment)

Figure 21:
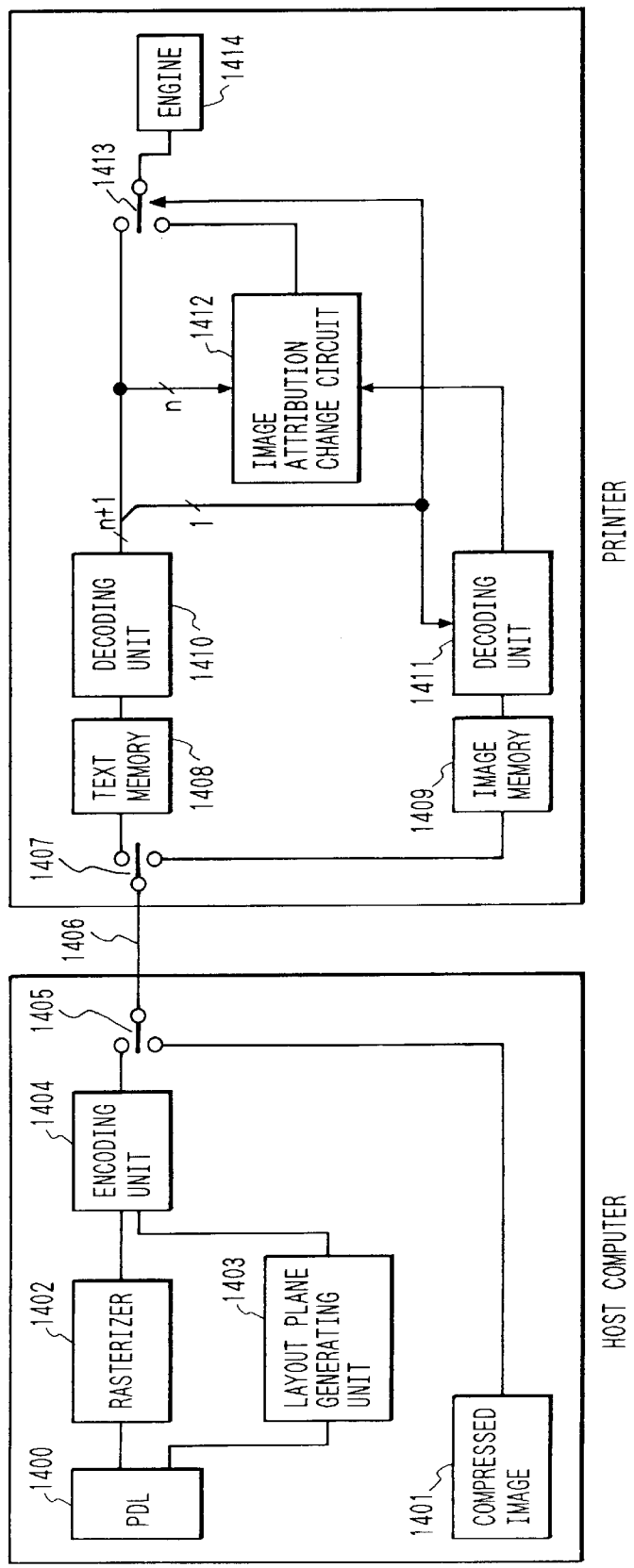
FIG. 21 is a block diagram showing the arrangement of the seventh embodiment of an image output system according to the present invention.

FIG. 21 is a block diagram showing the seventh embodiment of the present invention. FIG. 21 illustrates in the form of simple blocks a system in which a host computer is connected to a printer, like FIG. 12 showing the fourth embodiment. Blocks with the same functions as in the fourth embodiment are not particularly described in this embodiment.

In outputting a plurality of images, no discrimination need be performed between these images it they do not overlap in the main-scanning direction as in the fifth and the sixth embodiments. In this embodiment, therefore, there is provided a unit for embedding information for changing the attribution of an image into n bits representing the color information of a text for an image part of text information by the use of a layout plane.

Referring to FIG. 21, a decoding unit 1410 for decoding texts operates constantly in decoding. The outputs from the decoding unit 1410 are n bits of text data and one bit of layout plane data. The layout plane is input to a decoding unit 1411 for decoding images, thereby controlling decoding. The image data thus decoded is applied to an image attribution change circuit 1412, and at the same time the decoded text data is also input to the image attribution change circuit 1412. This image attribution change circuit 1412 has, for example, a circuit configuration capable of changing the density of an image. The image attribution change circuit 1412 with this configuration, therefore, can change the density of an image when a value representing the level of a density is set by the host computer in text data to be input to the circuit 1412. The image data changed by the image attribution change circuit 1412 is input to a selector 1413. The layout plane data is also input as a control signal to the selector 1413 to selectively output the text data and the image data to a printer engine 1414.

In addition, by changing the configuration of the image attribution change circuit, it is possible to perform processing of, e.g., changing the color balance of an image or shading an image.

With the above arrangement of this embodiment, the information for changing the attribution of an image can be embedded in the data of the image part of text information by the use of a layout plane, and this makes effective use of the data possible. In addition, this arrangement enables processing of changing the attribution of only an image, which is impossible by conventional systems.

According to the fourth to the seventh embodiments of the present invention as described above, in an image output system in which characters and line drawings to be developed into bit images by a host computer and compressed natural images are transferred separately to a printer and stored in a frame buffer memory, and image output is performed in accordance with a printer engine, a processing circuit for arranging a plurality of natural images at predetermined positions can be constituted easily. In addition, since information to be transferred to the printer to perform this processing is compressed, the transfer processing time can be shortened, and the memory capacities of the printer can also be reduced.

(8th Embodiment)

The eighth embodiment of an image processing apparatus according to the present invention will be described in detail below with reference to FIGS. 22 and 23A to 23E.

Figure 22:
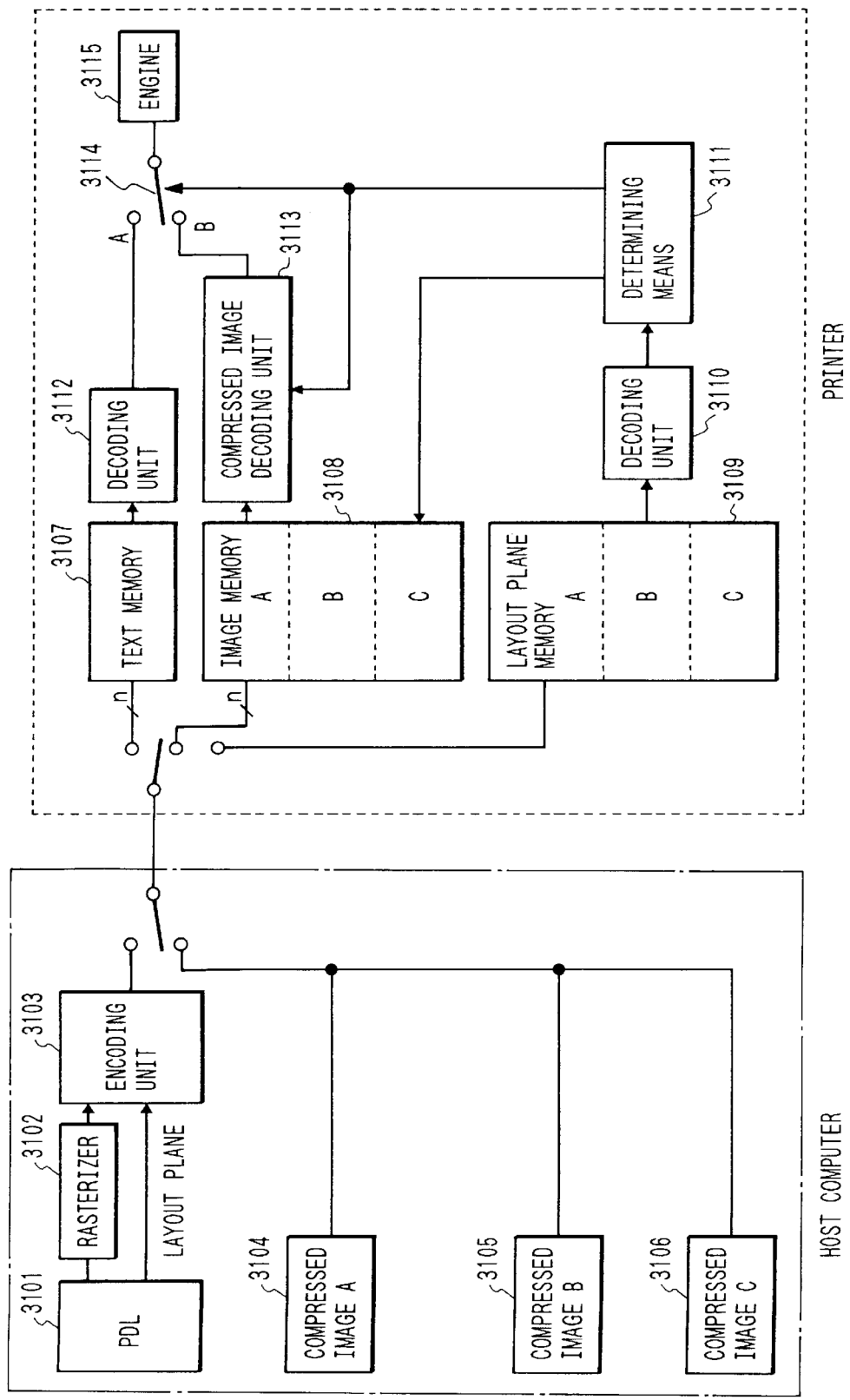
FIG. 22 is a block diagram showing the arrangement of the eighth embodiment of the present invention.

Referring to FIG. 22, a portion surrounded by alternate long and short dashed lines indicates a host computer, and a portion surrounded by dotted lines indicates a printer connected to the host computer. For the sake of descriptive simplicity, the host computer and the printer are connected in a one-to-one correspondence with each other.

The image processing apparatus shown in FIG. 22 includes a PDL (page descriptor language) unit 3101, a rasterizer 3102, an encoding unit 3103, and compressed images A (3104), B (3105), and C (3106) stored in the host computer.

When one page of a document, as shown in FIG. 2, is to be formed by application software of the host computer, text information, i.e., information indicating areas of characters and graphics except for image information is rasterized and transmitted after being encoded. In this case, information indicating image areas is also formed by the PDL 3101 and encoded before being transmitted. This information indicating image areas is information for distinguishing between image areas and the remaining area on the basis of layout information consisting of, e.g., the start addresses of X and Y coordinates at the start point of each image area and the lateral and longitudinal widths of the image. The information indicating image areas is, for example, information of one page in which "1" is placed at each pixel in image areas and "0" is placed at each pixel in an area except for the image areas.

This information will be referred to as a layout plane hereinafter.

In the printer, the received text information, image information, and layout plane are stored in a text memory 3107, an image memory 3108, and a layout plane memory 3109, respectively. Data from the text memory and the image memory are decoded using a determining unit on the basis of information obtained by decoding the information in the layout plane memory.

That is, upon receiving decoded information as shown in FIG. 6, the determining unit determines that a portion in which 0s are arranged is an area except for an image area. The determining unit therefore closes a switch 3114 to a terminal A to decode the text information and transmits the decoded information to a printer engine 3115.

On the other hand, determining that a portion in which 1s are arranged is an image area, the determining unit closes the switch 3114 to a terminal B and transmits the image information decoded by a compressed image decoding unit 3113 to the printer engine 3115. In this manner, the determining unit performs the determination in sequence in the raster direction and transmits the results to the printer engine.

When a document in which a plurality of compressed images are pasted on one page as shown in FIG. 7A is to be formed, the layout plane as shown in FIG. 7B is obtained in accordance with the above processing. If decoding is performed in sequence in the raster direction by using this layout plane, an image area B appears before an image A is transmitted completely. Since no discrimination between these image areas is performed, the image information of A remaining in the memory is transmitted to the image area B.

Figure 23E:
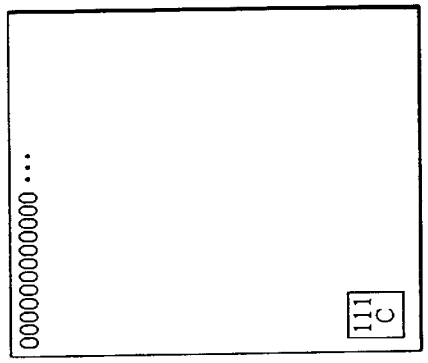
FIGS. 23A to 23E are views for explaining layout planes according to the eighth embodiment.
Figure 23B:
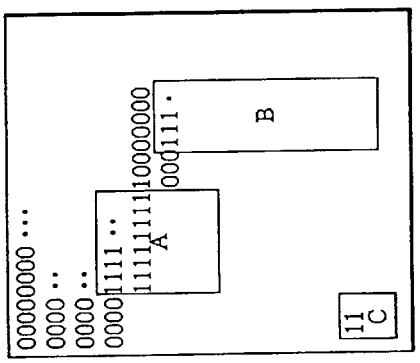
Figure 23D:
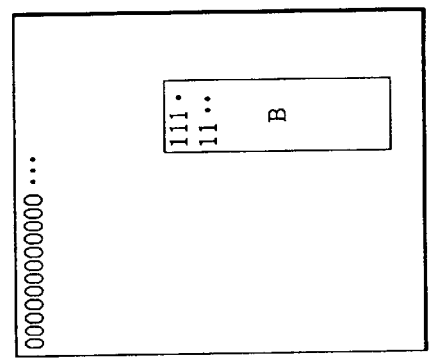
Figure 23A:
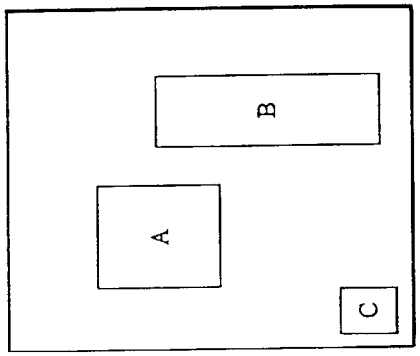
Figure 23C:
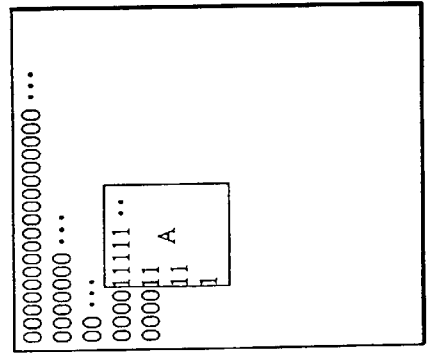

In this embodiment, therefore, if a plurality of image areas are present on one page, layout planes are formed for the individual images as shown in FIGS. 23C, 23D, and 23E.

These layout planes are encoded in the same manner as described above and stored in the layout plane memory 3109. The layout planes are then decoded and supplied to the determining unit. If all the layout planes are 0, the determining unit decodes the information in the text memory 3107, closing the switch 3114 to the terminal A, and transmitting the decoded information to the printer engine 3115.

Figure 24:
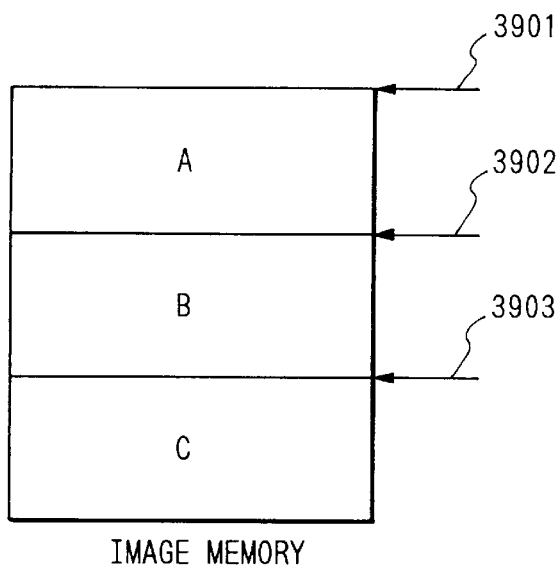
FIG. 24 is a schematic view showing an image memory.

If any of the layout planes is 1, the determining unit selects one of read registers A, B, and C (3901, 3902, and 3903 in FIG. 24) in the image memory, which indicates an image corresponding to the layout plane having 1. The determining unit decodes the information indicated by the selected register by compressed image coding while updating the register. The determining unit then closes the switch 3114 to the terminal B and transmits the decoded information to the printer engine 3115.

As described above, it is possible to determine the image area of each image because the layout plane is formed for each image, so no inconvenience takes place even if a plurality of image areas are present on one page.

(9th Embodiment)

The ninth embodiment of the present invention will be described below with reference to FIGS. 25, 26A, and 26B.

The characteristic feature of the present invention is that even if a plurality of compressed images are pasted in one page, the image areas of compressed images not overlapping in the main-scanning direction are presented in the same layout plane. "Not overlapping in the main-scanning direction" means a state in which only one image area exists in the main-scanning direction.

Figure 26A:
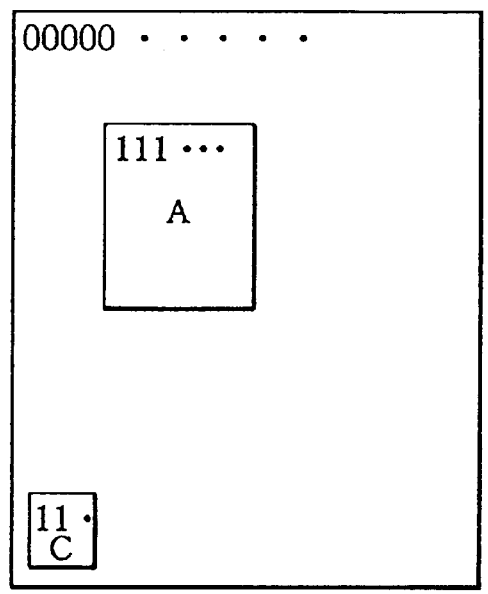
FIGS. 26A and 26B are views showing layout planes according to the ninth embodiment.
Figure 26B:
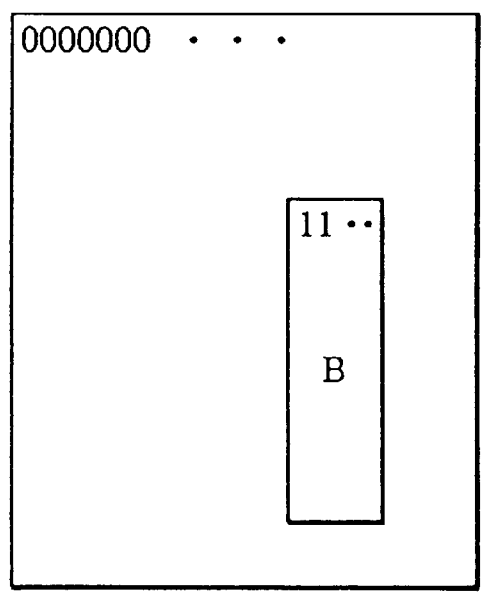

That is, for a document in which compressed images are pasted as shown in FIG. 23A, layout planes as shown in FIGS. 26A and 26B are formed.

Figure 25:
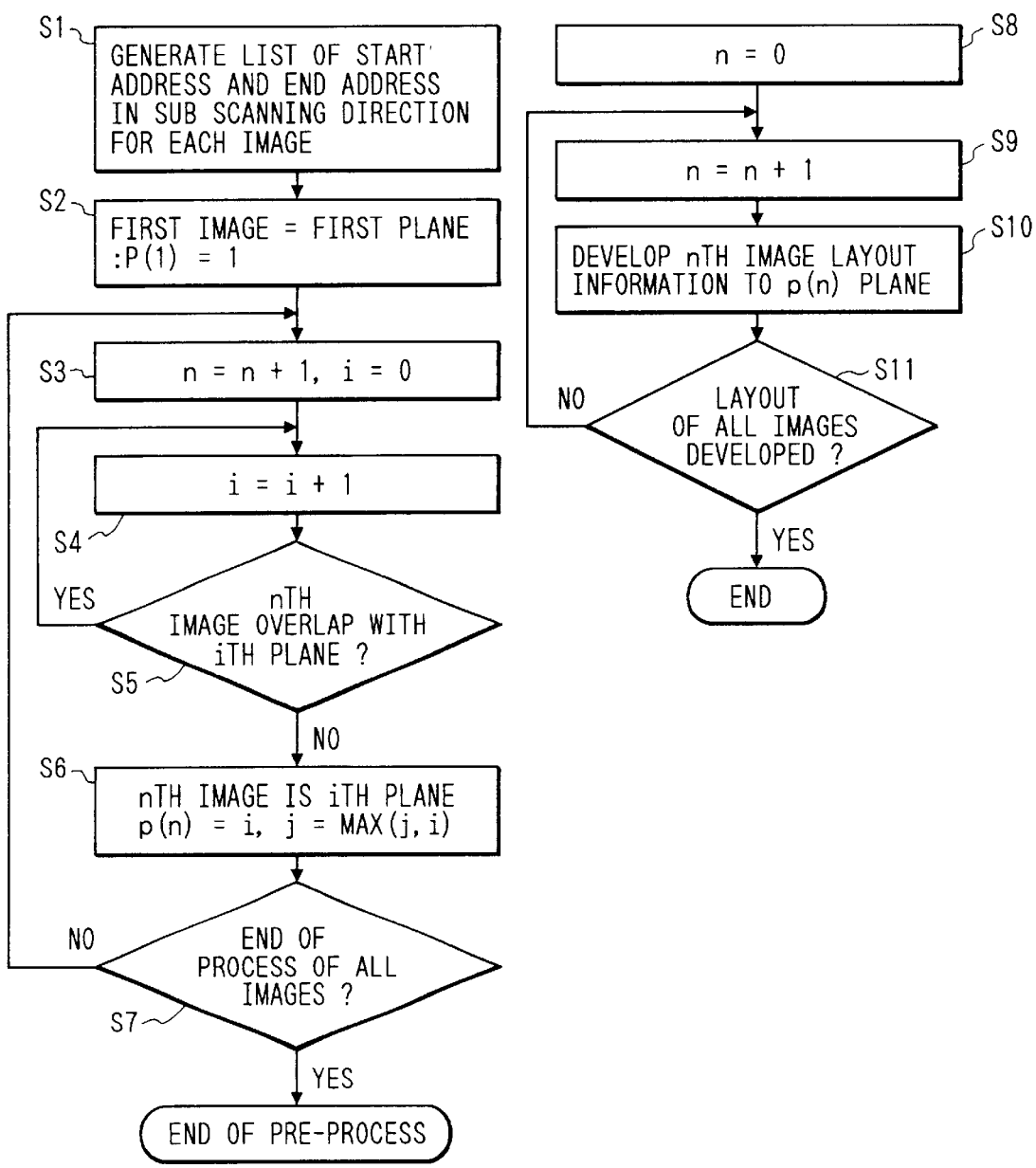
FIG. 25 is a flow chart for forming a layout plane according to the ninth embodiment of the present invention.

FIG. 25 is a flow chart showing a method of forming these layout planes. This flow chart will be described below.

First, a list of the start addresses and the end addresses in the sub-scanning direction of the image areas of compressed images pasted in one page of a document is generated (step S1).

Subsequently, it is determined that the image area of the first image is arranged in the first plane (step S2). (This plane means a layout plane before the image areas are presented.)

In step S5, it is checked on the basis of the above-mentioned list whether each of the second and subsequent images overlaps the image in the first plane in the main-scanning direction, i.e., whether the start address and the end address in the sub-scanning direction of one image overlap those of other images. If NO in step S5, the image areas of these images are arranged in the first plane (step S6). If YES in step S5, planes which do not overlap the second plane, the third plane, . . . are checked, and a correspondence between the image areas of the images and the checked planes is determined (step S4). This processing is repeatedly executed until all the images are processed (steps S3 and S7).

Thereafter, a necessary number of layout planes are formed by developing the layout information of the individual images into their respective planes (steps S8 to S11).

Assume that the image output apparatus shown in FIG. 22 is operated to transmit the document shown in FIG. 23A to the printer engine while performing determinations in sequence in the raster direction by using the layout planes shown in FIGS. 26A and 26B formed by the above method. In this case, transmission of the image area B is started before the image area A is completely transmitted. Since, however, these image areas are formed on different layout planes, pieces of image information to be transmitted are switched by the processing described in the above embodiment. The transmission of the image information of A is completed when the image area C appears, so C is transmitted without performing switching. Therefore, the use of the same layout plane brings about no inconvenience.

According to this embodiment as described above, the processing activity for decoding can be simplified by transferring information which discriminates between image areas and an area except for images to the image output apparatus.

(10th Embodiment)

The 10th embodiment of an image processing apparatus according to the present invention will be described in detail below with reference to FIGS. 27 and 30A to 30C.

Figure 27:
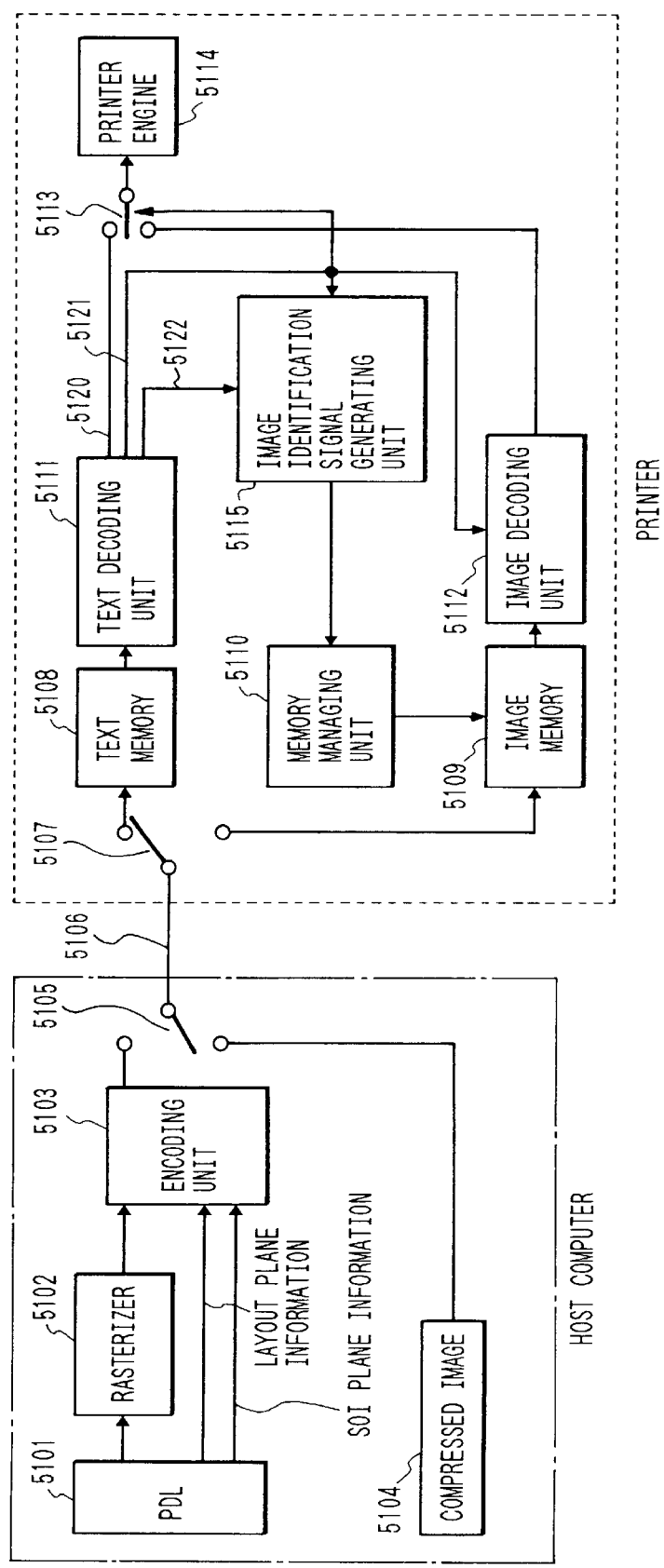
FIG. 27 is a block diagram showing the arrangement of the tenth embodiment of the present invention.

Referring to FIG. 27, a portion surrounded by alternate long and short dashed lines indicates a host computer, and a portion surrounded by dotted lines indicates a printer. For the sake of descriptive simplicity, assume that the host computer and the printer are connected in a one-to-one correspondence with each other.

The image processing apparatus shown in FIG. 27 includes a PDL (page descriptor language) unit 5101, a rasterizer 5102, an encoding unit 5103, and a compressed image 5104 stored in the host computer. The details of these units 5101 to 5104 are the same as those in conventional examples.

When one page of a document, as shown in FIG. 2, is to be formed, text information and graphic information indicating graphics, except for image information, are rasterized and transmitted after being encoded in the same manner as in conventional apparatuses. At the same time, layout plane information indicating an image area and an SOI plane are also formed by the PDL 5101, encoded together with the text information by the encoding unit 5103, and transmitted to the printer through a selector 5105 and a cable 5106. Image information, on the other hand, is transmitted in a compressed state to the printer.

In the printer, the received text information and image information are stored in a text memory 5108 and an image memory 5109, respectively.

The text information, the layout plane information, and the SOI plane information stored in the text memory are decoded simultaneously by a text decoding unit 5111. The decoded text information, layout plane information, and SOI plane information are supplied to signal lines 5120, 5121, and 5122, respectively.

The location of the image information is determined on the basis of the layout plane information of the above three pieces of information decoded at the same time.

As an example, if the layout plane information is the one shown in FIG. 3, an image is arranged in the area of "1" surrounded by dotted lines.

The image information arranged at this position can be obtained by decoding the compressed image information stored in the image memory 5109 by an image decoding unit 5112. The operation of this image decoding unit is controlled by the above layout plane information. That is, the image decoding unit performs decoding when the value of the layout plane information is "1" and stops the decoding operation when the value is "0".

A selector 5113 is also controlled by the layout plane information. That is, decoded image information is supplied to a printer engine 5114 when the decoding operation is performed. When, in contrast, no decoding is performed, the output from the text decoding unit 5111 is supplied to the printer engine 5114.

If a plurality of images to be decoded are present, control for determining which image is to be decoded is necessary in addition to the above control. Units for performing this control are an image identification signal generating unit 5115 and a memory managing unit 5110.

The memory managing unit 5110 manages a correspondence between the number of each compressed image information and a location (address) of the image memory 5109 at which the information is stored. The memory managing unit 5110 reads out, from the image memory 5109, compressed image information corresponding to an image number supplied from the image identification signal generating unit, and supplies the readout image information to the image decoding unit 5112.

The image identification signal generating unit 5115 identifies the number of each image to be decoded by the image decoding unit 5112. The number of each image cannot be identified by the above-mentioned layout plane information alone although the location of the image can be known by that information.

The SOI plane, therefore, is used for this purpose.

Figure 28:
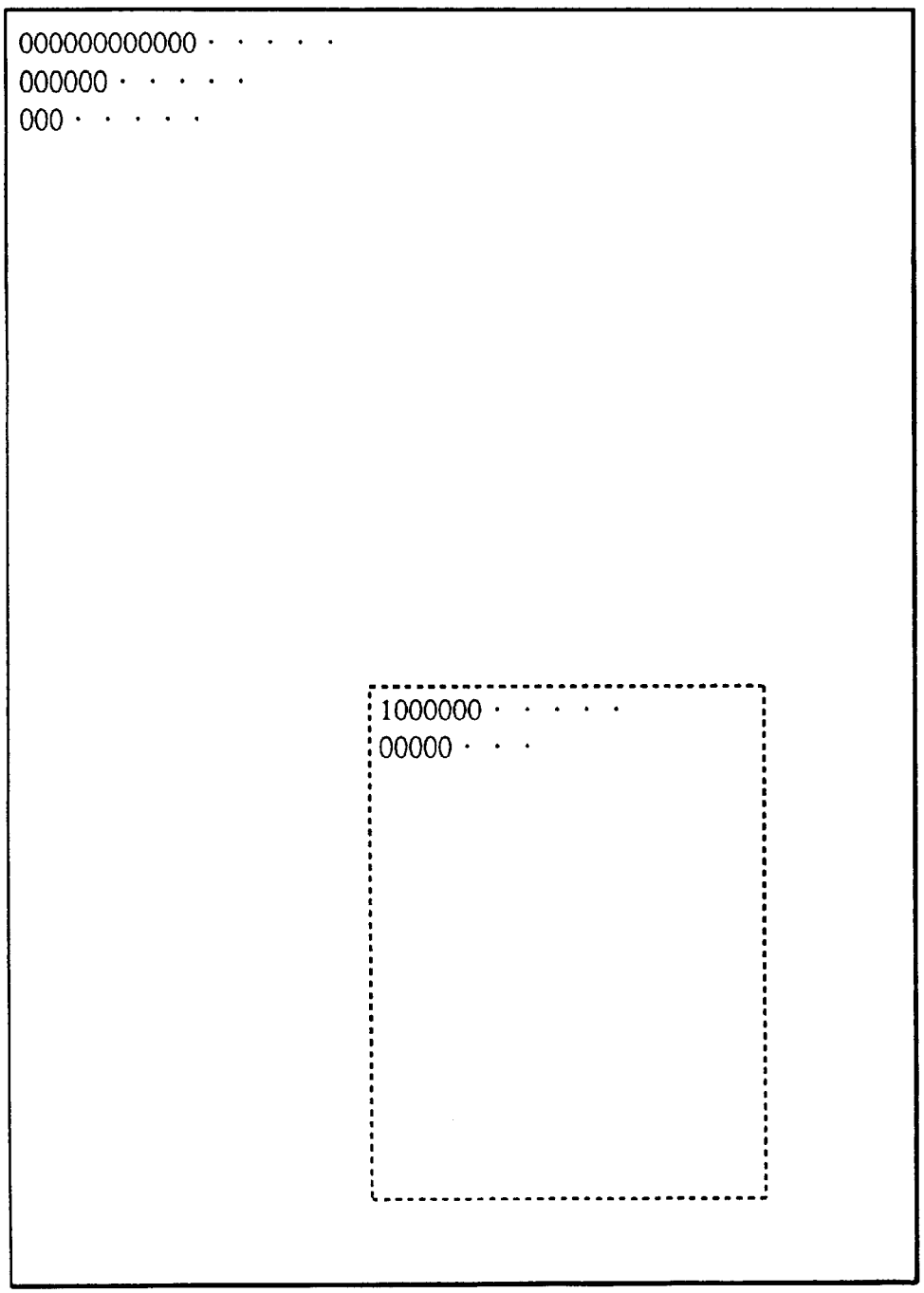
FIG. 28 is a view showing SOI plane information of a document.

As shown in FIG. 28, the SOI plane is bit map information in which the start position (the upper left position) of an image is represented by "1", and the other area of the image is represented by "0". The value of an area in which no image is arranged is naturally "0".

The number of "1"s is equal to the number of images to be arranged, so the number of "1"s is N if N images are to be arranged in one page.

On the basis of information of "1" on this SOI plane, the image identification signal generating unit 5115 generates the number of each image to be arranged.

Figure 29:
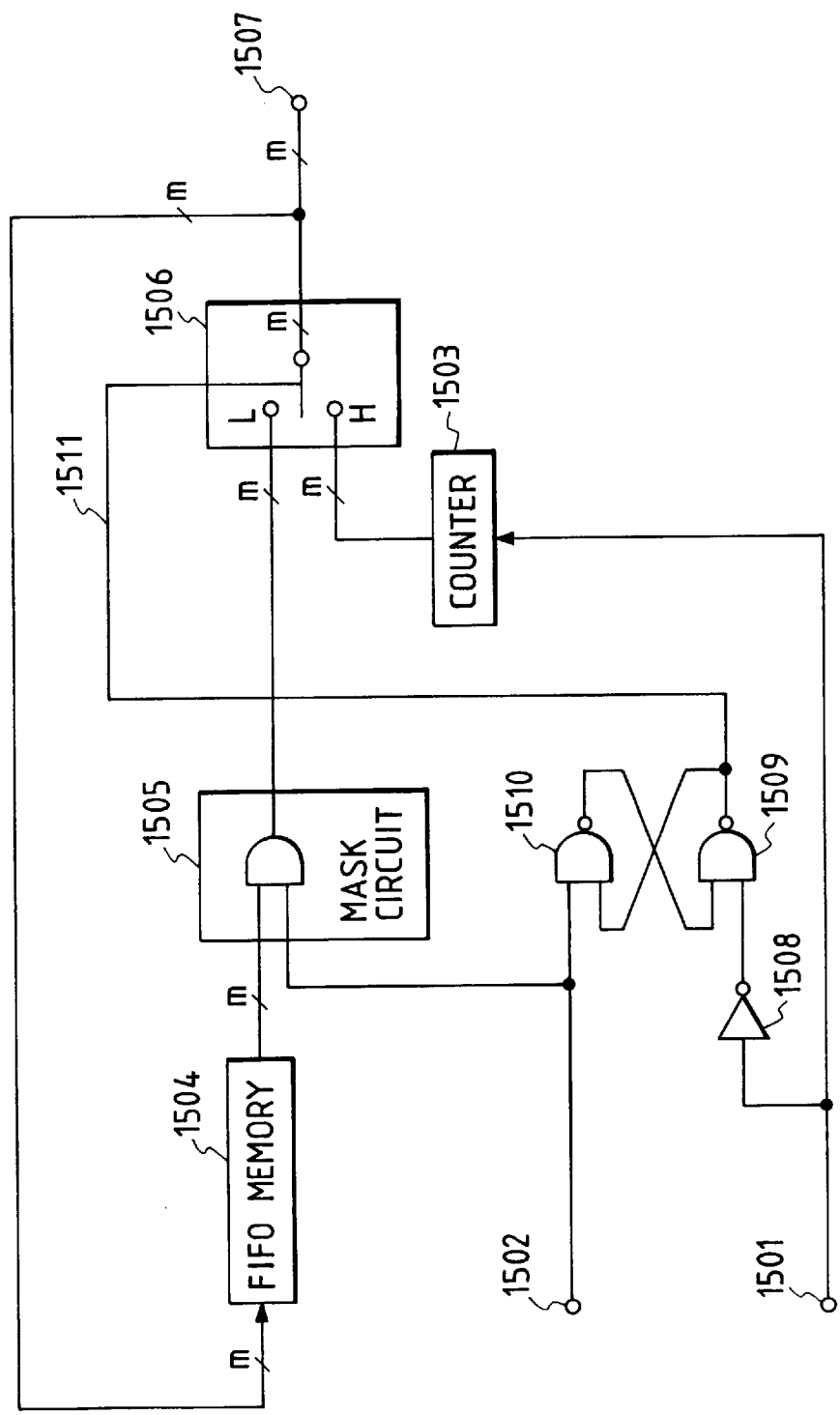
FIG. 29 is a view showing an image identification signal generating unit 5115 shown in FIG. 27.

FIG. 29 is a block diagram showing the image identification signal generating unit 5115.

Referring to FIG. 29, the image identification signal generating unit 5115 includes an input terminal 1501 for receiving the SOI plane information, an input terminal 1502 for receiving the layout plane information, an m-bit counter 1503 for detecting and counting "1"s in the SOI plane, an m-bit wide FIFO memory 1504 with a capacity corresponding to pixels in the main-scanning direction, a mask circuit 1505 for masking an m-bit output from the FIFO memory to zero, a selector 1506 for performing switching between the outputs from the mask circuit and the counter, an output terminal 1507 for delivering an image number, a NOT element 1508, and two-input NAND elements 1509 and 1510 constituting an R-S flip-flop. This R-S flip-flop generates an output signal 1511.

Figure 30A:
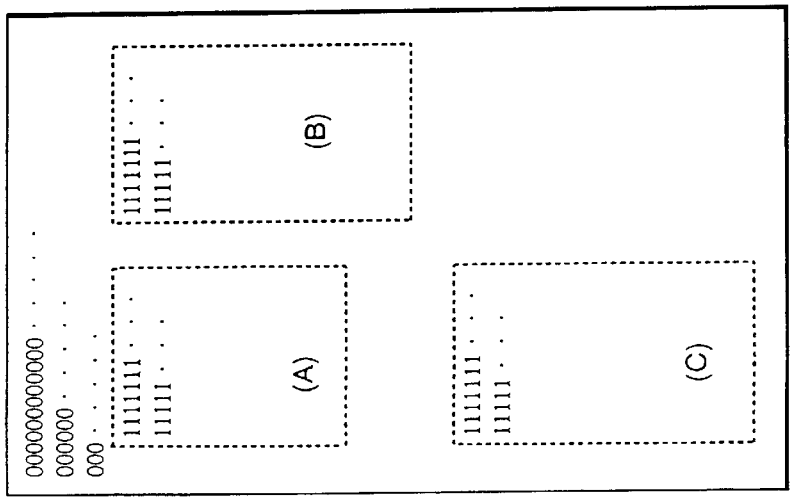
FIGS. 30A to 30C are views showing layout plane information, SOI plane information, and image numbers given to images of a document including three images.
Figure 30B:
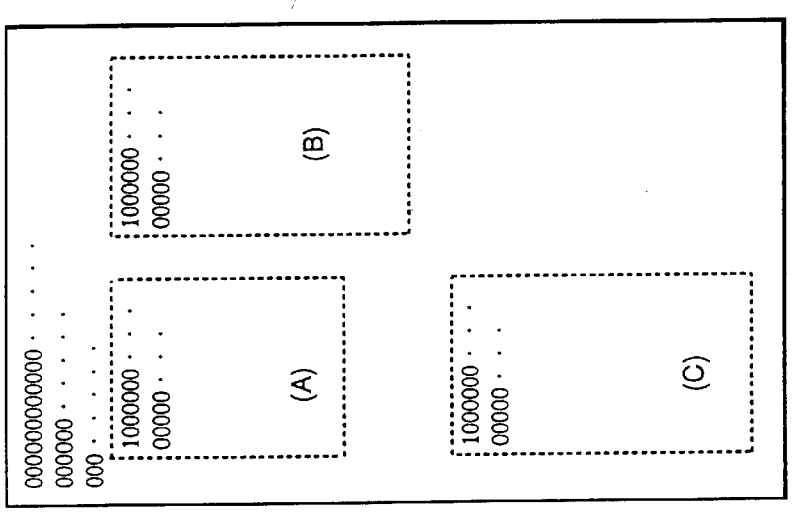

Suppose layout plane information shown in FIG. 30A and SOI plane information shown in FIG. 30B are input to the image identification signal generating unit with the above arrangement. Each input information is raster-scanned from the upper left corner of a page.

First, the counter 1503 is cleared to zero by a circuit (not shown), and the output signal 1511 from the R-S flip-flop is also set at level Low.

"0"s are successively input for each plane until the position of the first image is reached. While "0"s are input, an m-bit signal masked to zero by the mask circuit 1505 is kept supplied to the image number output terminal 1507.

When the position of the first image A is reached, the SOI plane information goes to "1", and the counter 1503 counts up to "1". Also, the R-S flip-flop is set to set the output signal 1511 at level High.

As a result, the output signal value "1" from the counter 1503 is selected as an image number by the selector 1506 and supplied to the terminal 1507. The output from the selector 1506 is also input to the FIFO memory 1504.

The value of the layout plane information remains "1" for some time immediately after the SOI plane information goes to "1", and returns to "0" when the dimension of the image in the lateral direction is exceeded. Therefore, the R-S flip-flop is reset to set the output signal 1511 at level Low, and the m-bit signal masked to zero by the mask circuit 1505 is output again.

As the scan proceeds further, the position of the next image B is reached, and the SOI plane information goes to "1" again. The value of the counter 1503 goes this time to "2", and this value is supplied as an image number to the terminal 1507 via the selector 1506. This output is also applied to the FIFO memory 1504.

As with the image A, the above state continues until the dimension of the image in the lateral direction is exceeded. Scanning on that line is then finished, and scanning on the next line is started.

Since there is no "1" in the SOI plane information for the next line, the image identification signal generating unit 5115 is controlled by the layout plane information alone. The image number of the immediately preceding line is already stored in the FIFO memory 1504. This image number is read out from the FIFO at a timing accurately delayed by one line.

The readout image number information is applied to the mask circuit 1505. Since, however, the layout plane information is "1" in the image area, this image number information passes through the mask circuit without being masked. As a result, the same image number information as for the immediately preceding line is output from the terminal 1507 via the selector 1506. This output information is input again to the FIFO memory 1504.

The above processing is repeatedly executed for both the images A and B as long as their respective image areas continue vertically (downward).

Subsequently, scanning is started for the line next to the end of the area of the image A. At this point, the image number corresponding to the image A is still stored in the FIFO memory 1504. The layout plane information input from the terminal 1502, however, has no information indicating the area of the image A, i.e., the input signal from the terminal 1502 remains "0".

The m-bit signal read out from the FIFO memory 1504 after being delayed by one line is therefore masked to zero by the mask circuit 1505 and output to the terminal 1507 via the selector 1506. Since the area of the image B continues, on the other hand, the layout plane information applied from the terminal 1502 goes to "1" when the scan has reached that area. Consequently, the image number corresponding to the image B stored in the FIFO memory 1504 passes through the mask circuit 1505 without being masked and is output from the terminal 1507 via the selector 1506.

The above processing is repeatedly performed for the area of the image B as long as the area continues vertically. In scanning the line next to the end of the area of the image B, similar to the processing for the image A, the output image number from the FIFO memory 1504 is masked to zero by the mask circuit 1505 and output from the terminal 1507.

At the time the scanning for that line is finished, all the contents of the FIFO memory 1504 are cleared to zero. This state continues until a subsequent image area, i.e., an area in which the SOI plane information is "1" is reached.

When the area of the image C is reached as the line scan proceeds, the SOI plane information goes to "1", and the counter 1503 counts up to "3". Also, the R-S flip-flop is set to set the output signal 1511 at level High.

The subsequent processing is exactly the same as those explained above for the images A and B. That is, the image number of the image C is output from the terminal 1507 only in an area corresponding to the image area of the image C.

Figure 30C:
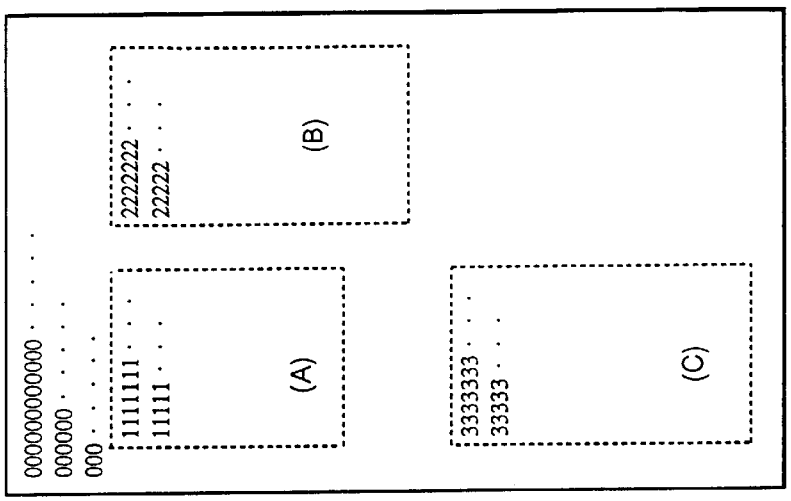

As a result, the image number information shown in FIG. 30C is generated by the image identification signal generating unit 5115 on the basis of the layout plane information shown in FIG. 30A and the SOI plane information shown in FIG. 30B. This image number information is supplied to the memory managing unit 5110, thereby reliably arranging the corresponding images.

(11th Embodiment)

The 11th embodiment of the present invention will be described in detail below with reference to FIG. 31.

In this embodiment, another arrangement of the image identification signal generating unit 5115 shown in FIG. 27 will be described. Therefore, any other arrangement of the system of this embodiment is the same as that shown in FIG. 27, and so a description of the operation of the system will be omitted.

Figure 31:
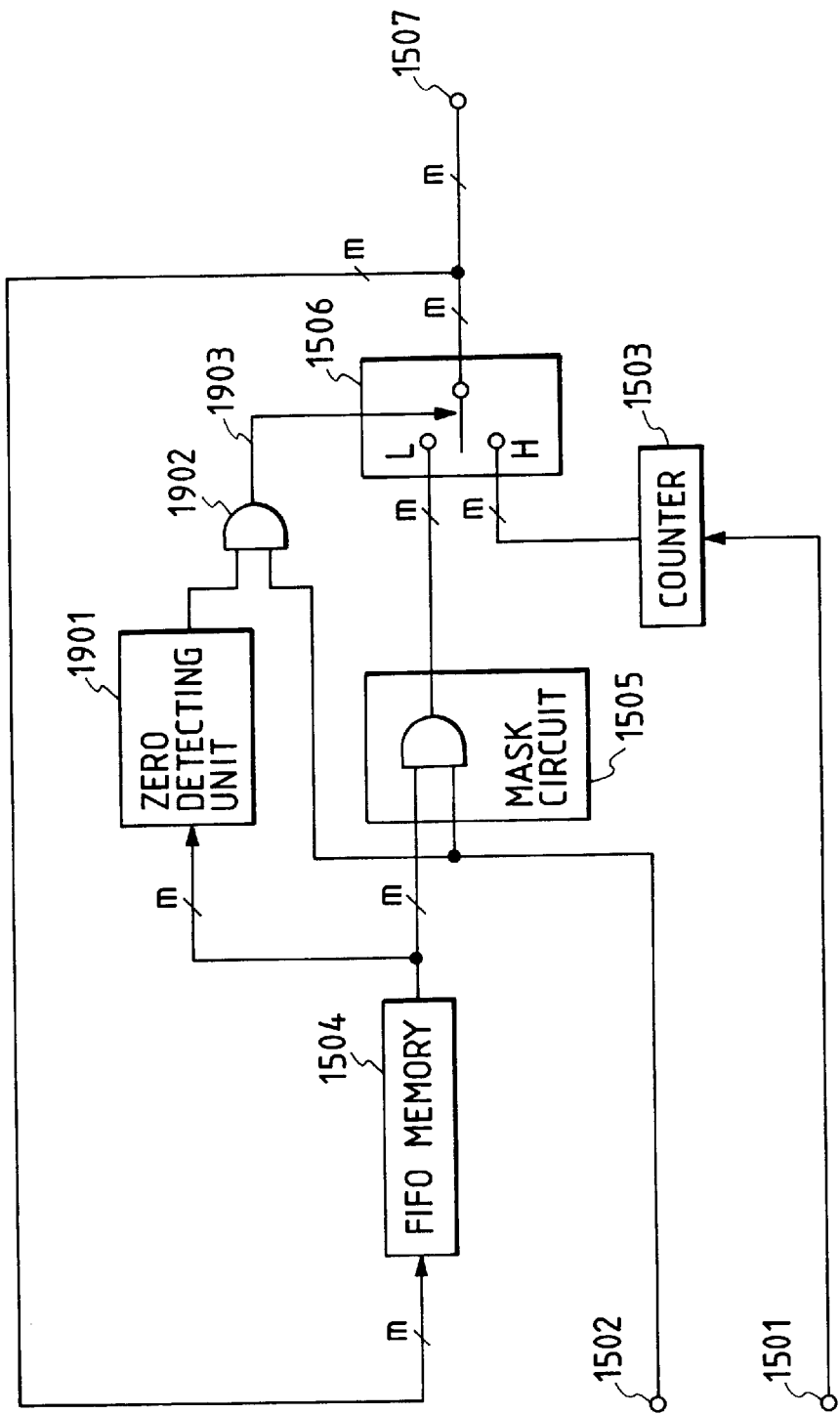
FIG. 31 is a block diagram showing an image identification signal generating unit according to the eleventh embodiment of the present invention.

In FIG. 31, the same reference numerals as in FIG. 29 denote blocks or I/O terminals with the same functions, and a detailed description thereof will be omitted.

In FIG. 31, blocks different from those shown in FIG. 29 are a zero detecting unit 1901 and a two-input AND element 1902.

The zero detecting unit 1901 detects that all bits of an m-bit signal from a FIFO memory 1504 are "0". This detection result indicates that an immediately preceding line is not an area of an image.

The two-input AND element 1902 ANDs the detection result and input layout plane information from a terminal 1502, thereby indicating that an area of an image starts from a line currently being scanned. This AND result is supplied to a signal line 1903.

In this embodiment, it is required to first clear a counter 1503 and clear the FIFO memory 1504 to zero.

Assume, as in the above embodiment, that the layout plane information shown in FIG. 30A and the SOI plane information shown in FIG. 30B are input to the image identification signal generating unit.

First, "0"s are kept input for both the planes until the position of the first image is reached. While "0"s are kept input, the signal line 1903 is at level Low, and so the m-bit output signal (whose value is of course zero) from a mask circuit 1505 is output to an image number output terminal 1507.

When the position of the first image A is reached, the SOI plane information goes to "1", and the counter 1503 counts up to "1".

At this point, the layout plane information is also "1". In addition, since the m-bit output from the FIFO memory 1504 is zero, this output is detected by the zero detecting unit 1901, and the output signal 1903 from the AND element 1902 goes to level High.

Consequently, the value "1" of the output signal from the counter 1503 is selected as an image number by a selector 1506 and output to the terminal 1507. The output from the selector 1506 is also input to the FIFO memory 1504.

The value of the layout plane information remains "1" for some time immediately after the SOI plane information goes to "1", and returns to "0" when the dimension of the image in the lateral direction is exceeded. As a result, the output signal 1903 from the AND element 1902 goes to level Low, and the m-bit signal masked to zero by the mask circuit 1505 is output again.

As the scan proceeds further, the position of the next image B is reached, and the SOI plane information goes to "1" again. The value of the counter 1503 goes this time to "2", and this value is output as an image number to the terminal 1507 via the selector 1506. This output is also input to the FIFO memory 1504.

As with the image A, the above state continues until the lateral dimension of the image is exceeded. When this lateral dimension is exceeded, the output from the terminal 1507 returns to zero. Scanning on that line is then finished, and scanning for the next line is started.

The image number of the immediately preceding line is already stored in the FIFO memory 1504. This image number is read out from the FIFO at a timing accurately delayed by one line. In each image area, these readout contents represent an image number except for zero, which corresponds to the image. In an area other than the image areas, the content is zero.

The zero detection timing of the zero detecting unit 1901 is therefore exactly opposite to the timing at which the layout plane information goes to "1". For this reason, the output signal 1903 from the AND element is at level Low at any instant, and so the output from the mask circuit 1505 is output to the image number output terminal 1507 via the selector 1506.

The above processing is executed repeatedly for both the images A and B as long as their respective image areas continue vertically (downward).

Subsequently, scanning is started for the line next to the end of the area of the image A. At this point, the image number corresponding to the image A is still stored in the FIFO memory 1504. However, the layout plane information input from the terminal 1502 has no information indicating the area of the image A, i.e., the input signal from the terminal 1502 remains "0".

The m-bit signal read out from the FIFO memory 1504 after being delayed by one line is therefore masked to zero by the mask circuit 1505 and output to the terminal 1507 via the selector 1506.

Since the area of the image B still continues, on the other hand, the input layout plane information from the terminal 1502 goes to "1" when scanning has reached that area. Therefore, the image number corresponding to the image B stored in the FIFO memory 1504 passes through the mask circuit 1505 without being masked and is output from the terminal 1507 via the selector 1506.

Thereafter, the above processing is repeatedly executed for the area of the image B as long as the area continues vertically. In scanning the line next to the end of the area of the image B, similar to the processing for the image A, the output image number from the FIFO memory 1504 is masked to zero by the mask circuit 1505 and output from the terminal 1507.

At the time the scan for that line is finished, all the contents of the FIFO memory 1504 are cleared to zero. This state continues until a subsequent image area, i.e., an area in which the SOI plane information is "1" is reached.

When the area of the image C is reached as the line scan proceeds, the SOI plane information goes to "1", and the counter 1503 counts up to "3". In addition, the zero detecting unit 1901 detects the zero output from the FIFO memory 1504, and "1" is input as the layout plane information. Therefore, the signal 1903 is set at level High.

The subsequent processing is exactly the same as those for the images A and B described above. That is, the image number of the image C is output from the terminal 1507 only in an area corresponding to the area of the image C.

As a result, the image number information shown in FIG. 30C is generated by the image identification signal generating unit shown in FIG. 31 on the basis of the layout plane information shown in FIG. 30A and the SOI plane information shown in FIG. 30B. This image number information is supplied to the memory managing unit 5110 shown in FIG. 27, thereby reliably arranging the corresponding images.

According to this embodiment as described above, the layout plane information indicating areas of images and the SOI plane information indicating the start positions of these images are generated simultaneously with PDL development. The text information obtained by the PDL development and the above information are encoded by the same encoding unit and transferred from a host computer to a printer. These pieces of information are decoded on the printer side.

On the basis of the layout plane information and the SOI plane information thus decoded, the image identification signal is generated by the image identification signal generating unit. This facilitates management of the layout of a plurality of images.

Consequently, flexible functions can be realized at a lower cost than in conventional systems.

(12th Embodiment)

The following drawbacks are found in printer systems in which a host computer generates printer descriptor language (PDL) programs and bit map images and transmits these pieces of information to a printer, and a controller of the printer develops and arranges the transmitted information to form hard copies, among other printer systems described in the conventional examples mentioned earlier.

(1) Transmission of the bit map images from the host computer to the printer is time-consuming or requires a wide-band transmission path because the quantity of the bit map images is very large.

(2) Fonts are required for both the host computer and the printer in developing codes. That is, a unit for this purpose cannot be shared by the host computer and the printer.

(3) A program developing unit of the printer is constituted by firmware and hence cannot be graded up.

(4) The program developing unit of the printer is constituted by firmware and hence has no expansibility.

(5) Since the operating ratio of the printer is generally lower than that of the host computer, the hardware resource of the printer cannot be used effectively.

Figure 32:
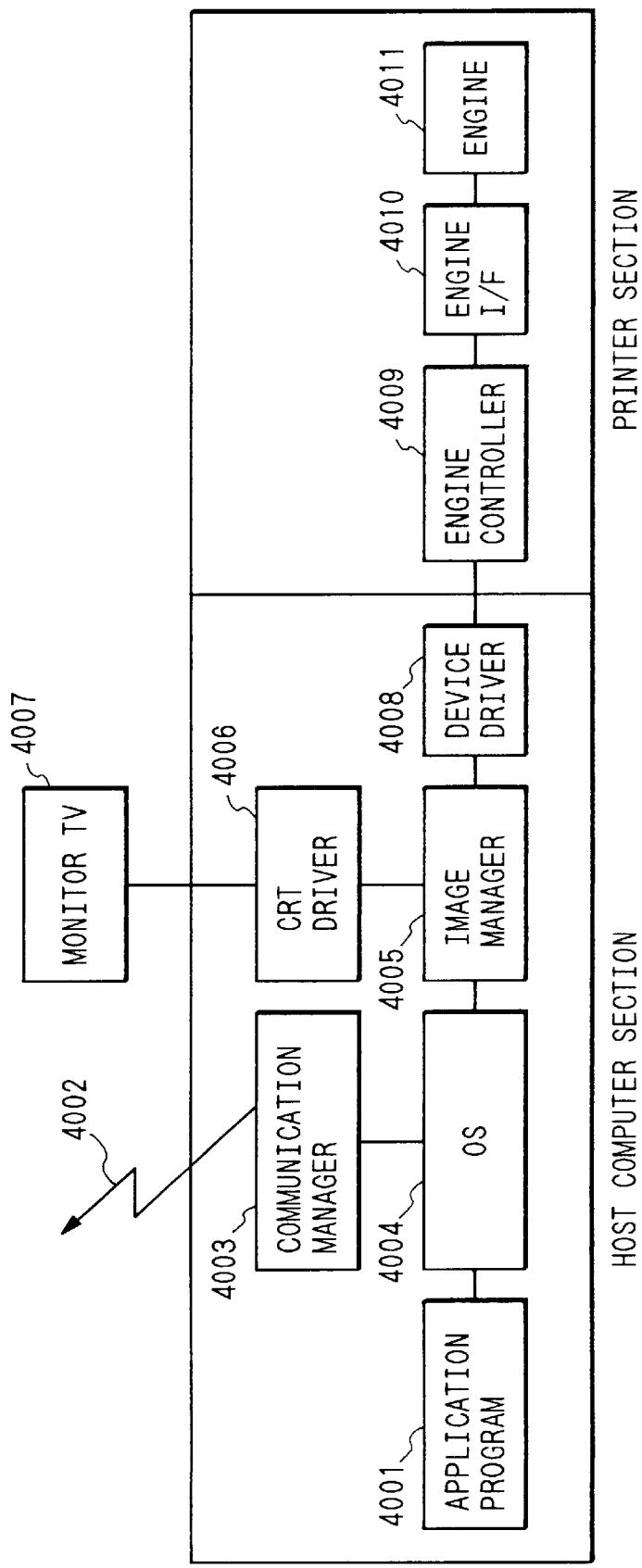
FIG. 32 is a block diagram showing the twelfth embodiment of the present invention.

In consideration of the above drawbacks, this embodiment adopts an arrangement as shown in FIG. 32. Referring to FIG. 32, an application program 4001 forms a document while exchanging files required in document formation through a communication line 4002 and a communication manager 4003.

The document thus formed can be displayed on a monitor TV 4007 via an OS 4004, an image manager 4005, and a CRT driver 4006. It is also possible to transmit the document to a printer section via a device driver, thereby obtaining hard copies by using an engine controller 4009, an engine I/F 4010, and a printer engine 4011.

Figure 33:
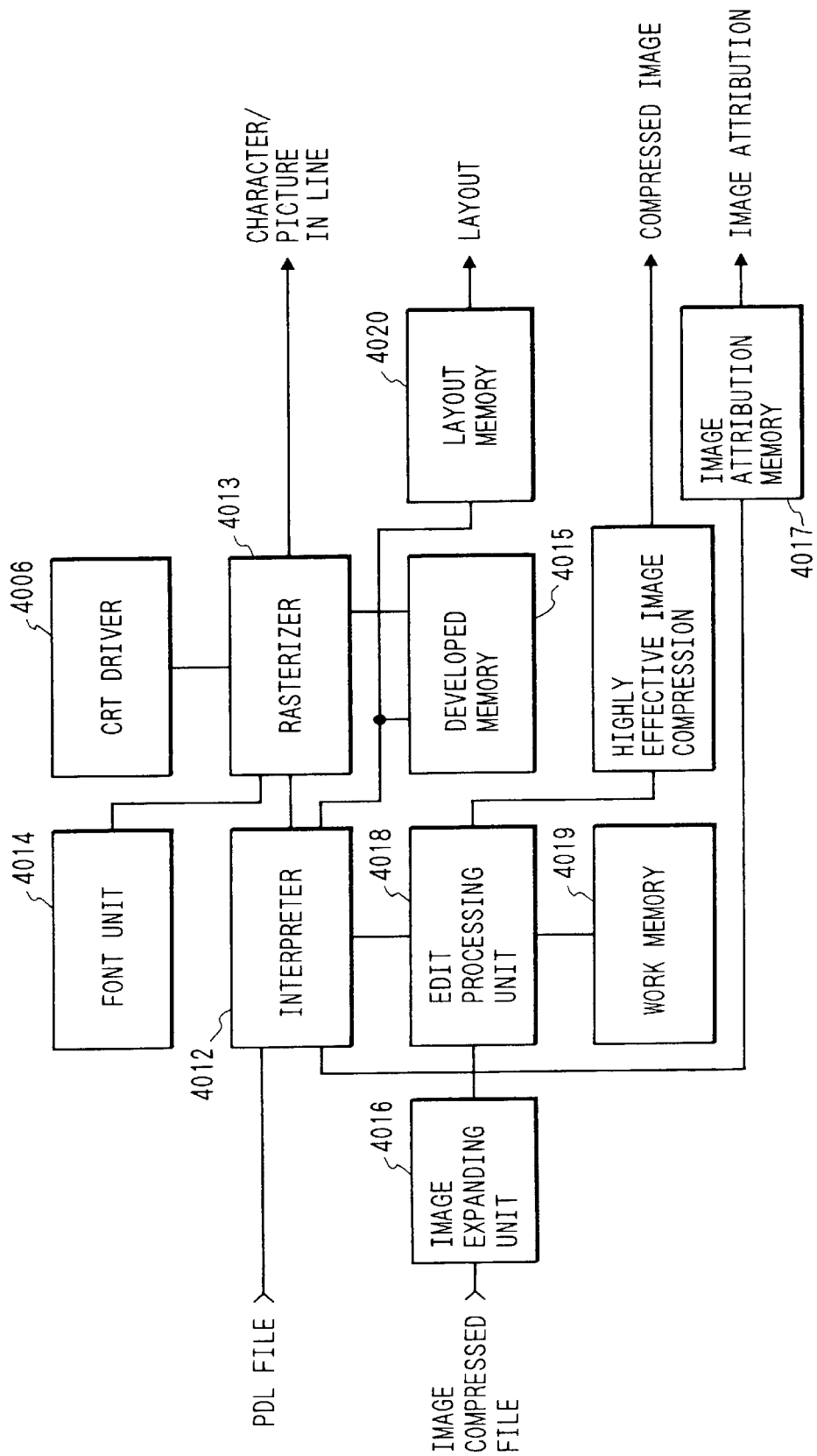
FIG. 33 is a block diagram showing the function of an image manager.

FIG. 33 is a block diagram showing the details of the image manager 4005. The image manager 4005 receives the document file generated by the application via the OS 4004. The document file consists of a PDL file and an image compressed file. The PDL file is developed into a developed memory 4015 by an interpreter 4012 and a rasterizer 4013 by using fonts stored in a font unit 4014.

The image information is received in the form of a compressed file and expanded by an image expanding unit 4016. The PDL file contains the edit command and the attribution of this image file. The interpreter 4012 separates these pieces of information from the PDL file, and the attribution information thus separated is stored in an image attribution memory 4017. Primary conversion is performed for the image by an edit processing unit 4018 and a work memory 4019 in accordance with the edit command, and the converted result is written in the developed memory 4015. The contents of the developed memory 4015 are sequentially supplied to the monitor TV 4001 via the CRT driver 4006 and monitored by an operator.

A layout control signal is stored in a layout memory 4020. The final document is generated in the developed memory 4015 by these processing activities. Characters and line drawings, highly effectively compressed images, layout information, and image attribution information are obtained from the image manager 4005.

Figure 34:
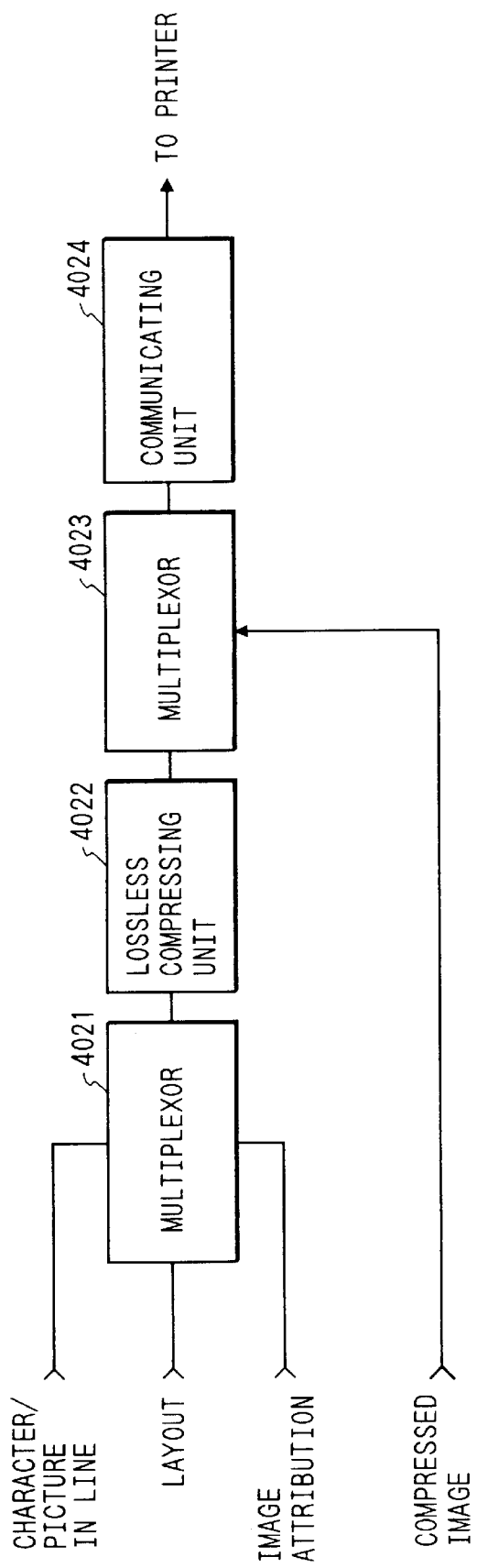
FIG. 34 is a block diagram showing the function of a device driver.

The function of the device driver is shown in FIG. 34. The character/line drawing information, the layout information, and the image attribution information supplied from the image manager 4005 are multiplexed by a multiplexer 4021 and compressed by a lossless compressing unit 4022 in a lossless (reversible) manner. These (compressed) signal and image are further multiplexed by a multiplexer 4023 and transmitted to the printer section via a communicating unit 4024.

Figure 35:
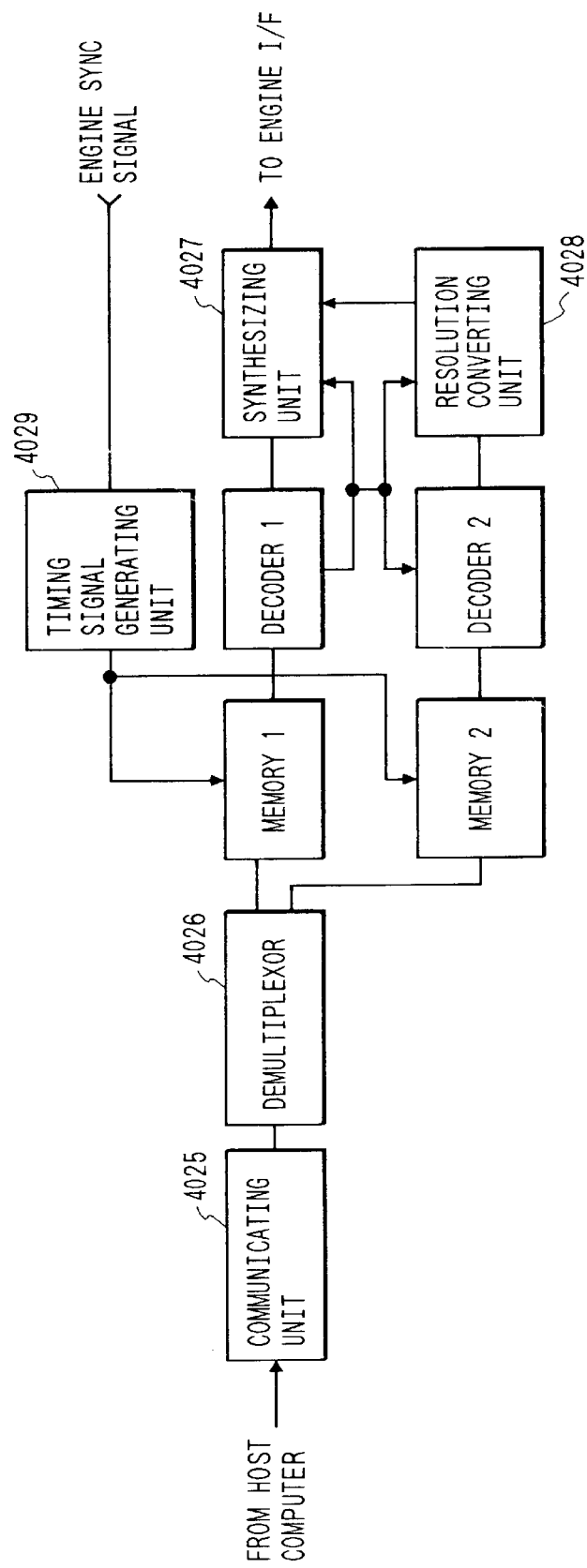
FIG. 35 is a block diagram showing the function of an engine controller.

The function of the engine controller 4009 of the printer section is shown in FIG. 35. The signal transmitted from the host computer section is received by a communicating unit 4025 and separated into the character/line drawing information, the layout information, the image attribution information, and the image (compressed) information by a demultiplexer 4026. The character/line drawing information, the layout information, and the image attribution information are stored in a memory 1, and the image (compressed) information is stored in a memory 2.

A decoder 1 expands the character/line drawing information, and a decoder 2 expands the image (compressed) information. The layout information and the image attribution information are also decoded by the decoder 1. The layout information is used to control a synthesizing unit 4027, and the image attribution information is used to control a resolution converting unit 4028. The former unit synthesizes the character/line drawing information and the image information, and the latter unit converts the dot density of the image file into the resolution of the engine. These processing activities are performed in real time by a timing signal generating unit 4029 in synchronism with the operation of the engine.

(13th Embodiment)

Figure 36:
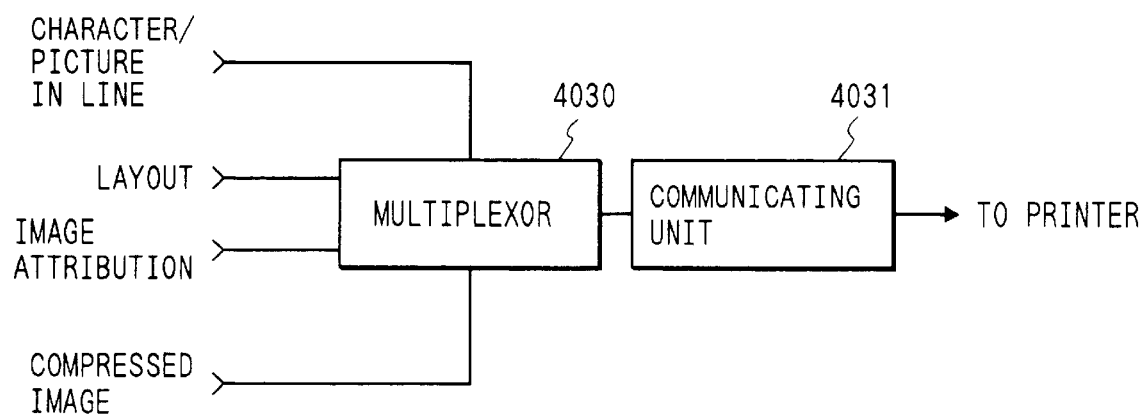
FIG. 36 is a block diagram showing a device driver according to the thirteenth embodiment of the present invention.

FIG. 36 shows another embodiment of the device driver. When character/line drawing information is binary, its information quantity is small. In this case, since the quantities of layout information and image attribution information are also small, the cost performance may improve if no compression is performed. In such a case, the character/line drawing information, the layout information, the image attribution information, and the image (compressed) information are directly multiplexed by a multiplexer 4030 and transmitted to a printer section via a communicating unit 4031.

This makes it unnecessary the character/line drawing information expanding function of the decoder 1 in the engine controller of the printer section, thereby reducing the size of the hardware.

According to the 12th and the 13th embodiments of the present invention as described above, since the information is exchanged in the form of compressed data between the host computer and the printer, the transmission time can be shortened. In addition, development into bit map images is performed only by the host computer, so fonts required in the development need only be provided in the host computer. Since the unit that is conventionally necessary in the printer is no longer required, the resource can be utilized effectively. Furthermore, the frame memory provided in the printer need only have a capacity meeting the compression ratio, and this reduces the cost of the overall apparatus. When the processing activities of the host computer are performed in a multitask manner such that the rasterizing processing is also executed as one task, the efficiency of the host computer can be further improved.

As has been described above, each embodiment of the present invention makes it feasible to perform highly efficient transfer and reproduction of images in performing image fitting.

The present invention is not limited to the above embodiments but can be modified without departing from the scope of the appended claims.

What is claimed is:

1. An image processing apparatus comprising:
    a receiver, arranged to receive a first image data to be inserted in a second image data and to receive encoded image layout information indicating a position at which the first image data is to be inserted in the second image data, wherein the first image data and the encoded image layout information are separately transmitted to said receiver;
    a decoder, arranged to decode the encoded second image data and the image layout information to provide decoded image layout information; and
    an editor, arranged to edit the second image data using the decoded image layout information provided by said decoder.

2. An apparatus according to claim 1, wherein the image layout information includes information of a plurality of areas.

3. An apparatus according to claim 1, wherein the information relating to the image includes first and second image information.

4. An apparatus according to claim 3, wherein at least one of the first and second image information comprises encoded information.

5. An apparatus according to claim 4, wherein the second image information and the encoded information are encoded by a common method.

6. An apparatus according to claim 3, wherein the first image information represents a natural image and the second image information represents a line drawing.

7. An apparatus according to claim 3, wherein said editor fits a second image represented by the second image information into a first image represented by the first image information, and the image layout information represents an area in which the second image information is to be fitted.

8. An image processing apparatus comprising:
    a receiver, arranged to receive a first image data and to receive encoded synthesized information that was obtained by synthesizing and encoding a second image data and image layout information, wherein the first image data and the encoded synthesized information are separately transmitted to said receiver;
    a decoder, arranged to decode the encoded synthesized information and to separate the decoded synthesized information into the second image data and the image layout information; and
    an editor, arranged to edit the first and second image data in accordance with the image layout information separated by said decoder,
    wherein the first image data is positioned in the second image data in accordance with the encoded synthesized information.

9. An apparatus according to claim 8, wherein
    the first image information as received by said receiver is encoded first image information, and
    said apparatus further comprises an image decoder, arranged to decode the encoded first image information.

10. An apparatus according to claim 8, wherein the first image information represents a natural image and the second image information represents a line drawing.

11. An apparatus according to claim 8, wherein the image layout information includes information of a plurality of areas.

* * * * *

UNITED STATES PATENT AND TRADEMARK OFFICE
CERTIFICATE OF CORRECTION

PATENT NO. : 6,597,467 B2
DATED : July 22, 2003
INVENTOR(S) : Nobutaka Miyake et al.

It is certified that error appears in the above-identified patent and that said Letters Patent is hereby corrected as shown below:

<u>Title page,</u>
Item [56], References Cited, U.S. PATENT DOCUMENTS, insert

| | | | |
|---|---|---|---|
| -- 5,420,693 | 5/1995 | Horiuchi et al. | 358/433 |
| 5,239,625 | 8/1993 | Bogart et al. | 395/128 |
| 5,267,047 | 11/1993 | Argente et al. | 358/400 |
| 5,208,905 | 5/1993 | Takakura et al. | 395/148 |
| 5,150,455 | 9/1992 | Morikawa et al. | 395/114 |
| 5,142,618 | 8/1992 | Fujiwara et al. | 395/146 |
| 4,962,475 | 10/1990 | Hernandez et al. | 364/900 |
| 4,918,624 | 4/1990 | Moore et al. | 395/114 |
| 4,905,185 | 2/1990 | Sakai | 395/146 |
| 4,815,029 | 3/1989 | Barker et al. | 395/146 |
| 4,667,248 | 5/1987 | Kanno | 358/451 |
| 4,942,541 | 7/1990 | Hoel et al. | 358/1.16 --. |

Signed and Sealed this

Fourth Day of May, 2004

JON W. DUDAS
*Acting Director of the United States Patent and Trademark Office*